(12) United States Patent
Grata et al.

(10) Patent No.: US 11,300,925 B2
(45) Date of Patent: *Apr. 12, 2022

(54) DYNAMIC FRESNEL PROJECTOR

(71) Applicant: MAGIC LEAP, INC., Plantation, FL (US)

(72) Inventors: Jeremy A. Grata, Coral Springs, FL (US); Zhiheng Jia, Weston, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/950,455

(22) Filed: Nov. 17, 2020

(65) Prior Publication Data

US 2021/0088968 A1 Mar. 25, 2021

Related U.S. Application Data

(63) Continuation of application No. 15/401,816, filed on Jan. 9, 2017, now Pat. No. 10,877,438.

(60) Provisional application No. 62/276,099, filed on Jan. 7, 2016.

(51) Int. Cl.
*H04N 13/00* (2018.01)
*G03H 1/22* (2006.01)
(Continued)

(52) U.S. Cl.
CPC ......... *G03H 1/2294* (2013.01); *G02B 27/017* (2013.01); *G02B 27/0944* (2013.01);
(Continued)

(58) Field of Classification Search
CPC ...... G03H 1/2294; G03H 1/2205; G03H 1/08; G03H 2210/452; G03H 2001/2297;
(Continued)

(56) References Cited

U.S. PATENT DOCUMENTS 7,046,447 B2  5/2006 Raber
8,115,801 B2 * 2/2012 Mei ............. H04N 5/232945
                                        348/36
(Continued)

FOREIGN PATENT DOCUMENTS

CN  103782592   5/2014
JP  07-225564   8/1995
(Continued)

OTHER PUBLICATIONS

Extended European Search Report dated Dec. 21, 2018 for European application No. 17736516.0, Applicant Magic Leap, Inc. 7 pages.

(Continued)

*Primary Examiner* — Frank F Huang
(74) *Attorney, Agent, or Firm* — Vista IP Law Group, LLP

(57) ABSTRACT

A system for generating multi-depth image sequence comprising a modulation array. The modulation array comprising a plurality of light modulators which may shift light incident upon the modulators by a number of degrees. The plurality of light modulators may shift light in concert according to a modulation shift pattern. The modulation shift pattern can be configured to focus incident light to a voxel or to form a 3-D image. One or more modulation shift patterns can be changed or cycled through to raster one or more image objects in one or more image depth planes.

20 Claims, 21 Drawing Sheets

(51) Int. Cl.
  *G02B 27/09* (2006.01)
  *H04N 13/344* (2018.01)
  *H04N 13/395* (2018.01)
  *G02B 27/01* (2006.01)
  *G03H 1/08* (2006.01)
  *H04N 9/31* (2006.01)
  *G03H 1/26* (2006.01)

(52) U.S. Cl.
  CPC .............. *G03H 1/08* (2013.01); *G03H 1/2205* (2013.01); *H04N 9/3138* (2013.01); *H04N 13/344* (2018.05); *H04N 13/395* (2018.05); *G02B 2027/014* (2013.01); *G02B 2027/0127* (2013.01); *G02B 2027/0178* (2013.01); *G03H 2001/2297* (2013.01); *G03H 2001/2655* (2013.01); *G03H 2210/452* (2013.01); *G03H 2223/16* (2013.01); *G03H 2223/23* (2013.01); *G03H 2225/32* (2013.01); *G03H 2225/61* (2013.01)

(58) Field of Classification Search
  CPC ....... G03H 2001/2655; G03H 2223/16; G03H 2223/23; G03H 2225/32; G03H 2225/61; G02B 27/0944; G02B 27/017; G02B 2027/014; G02B 2027/0127; G02B 2027/0178; H04N 13/344; H04N 13/395; H04N 9/3138
  See application file for complete search history.

(56) References Cited

U.S. PATENT DOCUMENTS

| | | | | |
|---|---|---|---|---|
| 8,194,096 B2* | 6/2012 | Hirakawa | ............... | A61B 5/065 345/619 |
| 8,717,412 B2* | 5/2014 | Linder | ................. | H04N 5/2624 348/36 |
| 10,877,438 B2 | 12/2020 | Grata et al. | | |
| 2004/0046885 A1* | 3/2004 | Regan | ................. | H04N 5/23293 348/333.11 |
| 2005/0286101 A1* | 12/2005 | Garner | ................. | G03H 1/2205 359/9 |
| 2010/0097444 A1* | 4/2010 | Lablans | ................. | G03B 35/00 348/46 |
| 2011/0141228 A1* | 6/2011 | Shimada | ............ | H04N 5/23251 348/36 |
| 2013/0050790 A1* | 2/2013 | Sung | .................... | G03H 1/0476 359/22 |
| 2013/0222384 A1* | 8/2013 | Futterer | ................... | G03H 1/26 345/426 |
| 2015/0168914 A1* | 6/2015 | Gelman | ............. | G02B 27/0093 359/9 |
| 2015/0346491 A1 | 12/2015 | Christmas et al. | | |
| 2015/0346495 A1 | 12/2015 | Welch et al. | | |

FOREIGN PATENT DOCUMENTS

| | | |
|---|---|---|
| JP | 08-129147 | 5/1996 |
| JP | 2013-026738 | 2/2013 |
| WO | WO 2013/38545 | 3/2013 |
| WO | WO 2015/184412 | 12/2015 |
| WO | WO 2015/186010 | 12/2015 |

OTHER PUBLICATIONS

Response to Final Office Action and AFCP filed Feb. 19, 2019 for U.S. Appl. No. 15/401,816.
RCE and Amendment filed Apr. 17, 2019 for U.S. Appl. No. 15/401,816.
Response to Extended European Search Report filed Jul. 18, 2019 for European application No. 17736516.0, Applicant Magic Leap, Inc. 13 pages.
Response to Non-Final Office Action filed Sep. 11, 2019, for U.S. Appl. No. 15/401,816.
Final office action dated Nov. 8, 2019 for U.S. Appl. No. 15/401,816.
Examination Report dated Dec. 3, 2019 for European application No. 17736516.0, Applicant Magic Leap, Inc. 4 pages.
Response to Final Office Action filed Jan. 8, 2020 for U.S. Appl. No. 15/401,816.
Advisory Action dated Jan. 16, 2020, U.S. Appl. No. 15/401,816, 3 pages.
Non-Final Office Action dated Apr. 2, 2020 for U.S. Appl. No. 15/401,816.
Office Action Response to EP Patent Appln. No. 17736516.0 dated Apr. 9, 2020.
Response to Non-Final Office Action filed Jul. 30, 2020, for U.S. Appl. No. 15/401,816.
Office Action dated May 25, 2020 for Chinese application No. 201780006022.0, Applicant Magic Leap, Inc. 14 pages.
Notice of Allowance for U.S. Appl. No. 15/401,816 dated Aug. 24, 2020.
Foreign Examiner's Report for EP Patent Appln. No. 17736516.0 dated Aug. 28, 2020.
Foreign OA Response for CN Patent Appln. No. 201780006022.0 dated Sep. 29, 2020.
1st Exam Report for AU Patent Appln. No. 2017205338 dated Oct. 22, 2020.
Foreign OA for JP Patent Application No. 2018-535117 dated Nov. 4, 2020.
Foreign Response for EP Patent Appln. No. 17736516.0 dated Dec. 29, 2020.
Foreign OA for CN Patent Appln. No. 201780006022.0 dated Jan. 26, 2021.
Foreign Examination Report for IN Patent Appln. No. 201847028048 dated Mar. 29, 2021.
Foreign Response for CN Patent Appln. No. 201780006022.0 dated Apr. 12, 2021.
Foreign OA for JP Patent Appln. No. 2018-535117 dated Jun. 4, 2021.
Foreign Response for JP Patent Appln. No. 2018-535117 dated Jan. 26, 2021.
Foreign Exam Report for EP Patent Appln. No. 17736516.0 dated Jul. 5, 2021.
Foreign OA for IL Patent Appln. No. 260093 dated May 23, 2021.
Foreign Decision of Rejection for CN Patent Appln. No. 201780006022.0 dated Jun. 28, 2021.
Foreign Response for JP patent Appln. No. 2018-535117 dated Sep. 2, 2021.
Foreign Response for IL Patent Appln. No. 260093 dated Sep. 14, 2021.
Foreign Response for IN Patent Appln. No. 201847028048 dated Sep. 27, 2021.
Foreign Response for AU Patent Appln. No. 2017205338 dated Oct. 12, 2021.
Foreign Request for Reexamination for CN Patent Appln. No. 201780006022.0 dated Oct. 13, 2021.
Foreign NOA for AU Patent Appln. No. 2017205338 dated Oct. 14, 2021.
Foreign NOA for IL Patent Appln. No. 260093 dated Oct. 17, 2021.
Foreign Response for EP Patent Appln. No. 17736516.0 dated Nov. 15, 2021.
Foreign Exam Report for NZ Patent Appln. No. 743880 dated Jan. 19, 2022.
Foreign FOA for JP Patent Appln. No. 2018-535117 dated Jan. 5, 2022 (with English translation).

\* cited by examiner

DYNAMIC FRESNEL PROJECTOR

CROSS-REFERENCE TO RELATED APPLICATION(S)

The present application is a continuation of pending U.S. patent application Ser. No. 15/401,816, entitled "DYNAMIC FRESNEL PROJECTOR," filed Jan. 9, 2017, which claims priority from U.S. Provisional Patent Application Ser. No. 62/276,099, entitled "DYNAMIC FRESNEL PROJECTOR," filed Jan. 7, 2016. The content of the aforementioned patent applications are hereby expressly and fully incorporated by reference in their entirety, as though set forth in full.

BACKGROUND

Modern computing and display technologies have facilitated the development of systems for so-called "virtual reality" or "augmented reality" experiences, wherein digitally reproduced images or portions thereof are presented to a user and may be perceived as real. A virtual reality ("VR") scenario typically involves presentation of digital or virtual image information without transparency to other actual real-world visual input. An augmented reality ("AR") scenario typically involves presentation of digital or virtual image information as an augmentation to visualization of the actual world around the user.

For example, referring to FIG. 1A, an augmented reality scene 100 is depicted wherein a user of an AR technology device sees a real-world park-like setting 102 featuring people, trees, buildings in the background, and a concrete platform 104. In addition to these items, the user of the AR technology also perceives that he/she "sees" a robot statue 106 standing upon the real-world platform 104, and a cartoon-like avatar character 108 flying by, even though these elements do not exist in the real world. As it turns out, the human visual perception system is very complex, and producing a VR or AR technology that facilitates a comfortable, natural-feeling, rich presentation of virtual image elements amongst other virtual or real-world imagery elements is challenging.

Referring to FIG. 1B, stereoscopic wearable glasses 112 type configurations have been developed which generally feature two displays (e.g. 114a, 114b) that are configured to display images with slightly different element presentation such that a three-dimensional perspective is perceived by the human visual system. Such configurations have been found to be uncomfortable for many users due to a mismatch between vergence and accommodation that must be overcome to perceive the images in three dimensions. Indeed, some users are not able to tolerate stereoscopic configurations. Additionally, in some imaging devices one or more imaging modules 116 that process the images (e.g. for displays 114a, 114b) may be integrated into the device. To keep the device "wearable", the imaging modules 116 must typically be small, thus there may be a trade-off between image quality and device size. For instance, larger imaging modules may produce higher quality image outputs on the displays (114a, 114b) at the same time rendering the glasses 112 unwieldy and/or heavy.

Referring to FIG. 1C, a simplified cross-sectional view of a human eye 118 is depicted featuring a cornea 120, iris 122, lens—or "crystalline lens" 124, sclera 126 choroid layer 128, macula 130, retina 132, and optic nerve pathway 134 to the brain. The macula is the center of the retina, which is utilized to see moderate detail. At the center of the macula is the "fovea", which is used for seeing the finest details. The fovea contains more photoreceptors (approximately 120 cones per visual degree) than any other portion of the retina.

The human visual system is not a passive sensor type of system. It is configured to actively scan the environment. In a manner somewhat akin to scanning an image with a flatbed scanner or using a finger to read Braille from a paper, the photoreceptors of the eye fire in response to changes in stimulation, rather than constantly responding to a constant state of stimulation. Thus motion is required to present photoreceptor information to the brain (as is motion of the linear scanner array across a piece of paper in a flatbed scanner, or motion of a finger across a word of Braille imprinted into a paper).

Indeed, experiments with substances such as cobra venom, which is utilized to paralyze the muscles of the eye, have shown that a human subject will experience blindness if positioned with his/her eyes open, viewing a static scene with venom-induced paralysis of the eyes. In other words, without changes in stimulation, the photoreceptors don't provide input to the brain and blindness is experienced. It is believed that this is at least one reason that the eyes of normal humans have been observed to move back and forth, or dither, in side-to-side motion in what are called "microsaccades".

As noted above, the fovea of the retina contains the greatest density of photoreceptors, and while humans typically have the perception that they have high-resolution visualization capabilities throughout their field of view, they generally actually have only a small high-resolution center that they are mechanically sweeping around a lot, along with a persistent memory of the high-resolution information recently captured with the fovea.

In a somewhat similar manner, the focal distance control mechanism of the eye (ciliary muscles operatively coupled to the crystalline lens in a manner wherein ciliary relaxation causes taut ciliary connective fibers to flatten out the lens for more distant focal lengths; ciliary contraction causes loose ciliary connective fibers, which allow the lens to assume a more rounded geometry for more close-in focal lengths) dithers back and forth by approximately ¼ to ½ diopter to cyclically induce a small amount of what is called "dioptric blur" on both the close side and far side of the targeted focal length. This is utilized by the accommodation control circuits of the brain as cyclical negative feedback that helps to constantly correct course and keep the retinal image of a fixated object approximately in focus.

The visualization center of the brain also gains valuable perception information from the motion of both eyes and components thereof relative to each other. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to focus upon an object at a different distance will automatically cause a matching change in vergence to the same distance, under a relationship known as the "accommodation-vergence reflex." Likewise, a change in vergence will trigger a matching change in accommodation, under normal conditions.

Working against this reflex, as do most conventional stereoscopic AR or VR configurations, is known to produce eye fatigue, headaches, or other forms of discomfort in users.

Movement of the head, which houses the eyes, also has a key impact upon visualization of objects. Humans move their heads to visualize the world around them. They often are in a fairly constant state of repositioning and reorienting the head relative to an object of interest. Further, most people prefer to move their heads when their eye gaze needs to move more than about 20 degrees off center to focus on a particular object (i.e., people don't typically like to look at things "from the corner of the eye"). Humans also typically scan or move their heads in relation to sounds—to improve audio signal capture and utilize the geometry of the ears relative to the head. The human visual system gains powerful depth cues from what is called "head motion parallax", which is related to the relative motion of objects at different distances as a function of head motion and eye vergence distance (i.e., if a person moves his head from side to side and maintains fixation on an object, items farther out from that object will move in the same direction as the head; items in front of that object will move opposite the head motion. These are very salient cues for where things are spatially in the environment relative to the person—perhaps as powerful as stereopsis). Head motion also is utilized to look around objects, of course.

Further, head and eye motion are coordinated with something called the "vestibulo-ocular reflex", which stabilizes image information relative to the retina during head rotations, thus keeping the object image information approximately centered on the retina. In response to a head rotation, the eyes are reflexively and proportionately rotated in the opposite direction to maintain stable fixation on an object. As a result of this compensatory relationship, many humans can read a book while shaking their head back and forth (interestingly, if the book is panned back and forth at the same speed with the head approximately stationary, the same generally is not true—the person is not likely to be able to read the moving book; the vestibulo-ocular reflex is one of head and eye motion coordination, generally not developed for hand motion). This paradigm may be important for augmented reality systems, because head motions of the user may be associated relatively directly with eye motions, and the system preferably will be ready to work with this relationship.

The systems and techniques described herein are configured to work with the visual configuration of the typical human to address these challenges.

SUMMARY

In one embodiment, a system for generating multi-depth image sequences includes one or more light sources, and one or more modulation arrays having a plurality of light modulators. The one or more light sources are configured to project light on at least some of the plurality of light modulators. The plurality of light modulators is configured to focus the light on a voxel, and generate multi-depth image sequences by rastering a plurality of voxels at different depths on the one or more image depth planes.

In one or more embodiments, the plurality of light modulators are configured to shift the phase of the light by a number of degrees. The plurality of light modulators may also be configured to shift the phase of the light according to a modulation shift pattern.

In one or more embodiments, the one or more light sources includes a green light source, a red light source, and a blue light source. The one or more modulation arrays may include a first modulation array configured to receive red light, a second modulation arrays configured to receive green light, and a third modulation arrays configured to receive blue light. The one or more modulation arrays may include a partitioned modulation array, the partitioned modulation array comprising a first area configured to receive red light, a second area configured to receive green light, and a third area configured to receive blue light.

In one or more embodiments, the system also includes a diffractive optical assembly comprising one or more waveguide layers, the one or more waveguide layers corresponding to different image depth planes. The system may also include a processor configured to direct the plurality of light modulators to form a Fresnel pattern. The processor may be configured to direct the plurality of light modulators to sequentially form a plurality of Fresnel patterns. At least two of the plurality of Fresnel patterns may be configured to focus the light on respective different voxels at different image depths.

In another embodiment, a system for generating multi-depth image sequences includes a light source, and a modulation array including a plurality of light modulators. The light source is configured to project light on at least some of the plurality of light modulators. The plurality of light modulators is configured to focus respective portions of the light to generate a multi-depth image.

In one or more embodiments, the plurality of light modulators is also configured to generate a sequence of multi-depth images. The plurality of light modulators may also be configured to shift the phase of the light by a number of degrees. The plurality of light modulators may also be configured to shift the phase of the light according to a modulation shift pattern.

In one or more embodiments, the light source is a white light source. The modulation arrays may be a partitioned modulation array including a first area configured to receive red light, a second area configured to receive green light, and a third area configured to receive blue light.

In one or more embodiments, the system also includes a diffractive optical assembly including one or more waveguide layers, the one or more waveguide layers corresponding to different image depth planes. The system may also include a processor configured to direct the plurality of light modulators to form a computer generated hologram. The processor may be configured to direct the plurality of light modulators to sequentially form a plurality of computer generated holograms. The modulation array may be an 8-bit LCOS.

Other additional objects, features, and advantages of the invention are described in the detailed description, figures, and claims.

BRIEF DESCRIPTION OF THE DRAWINGS

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1A:
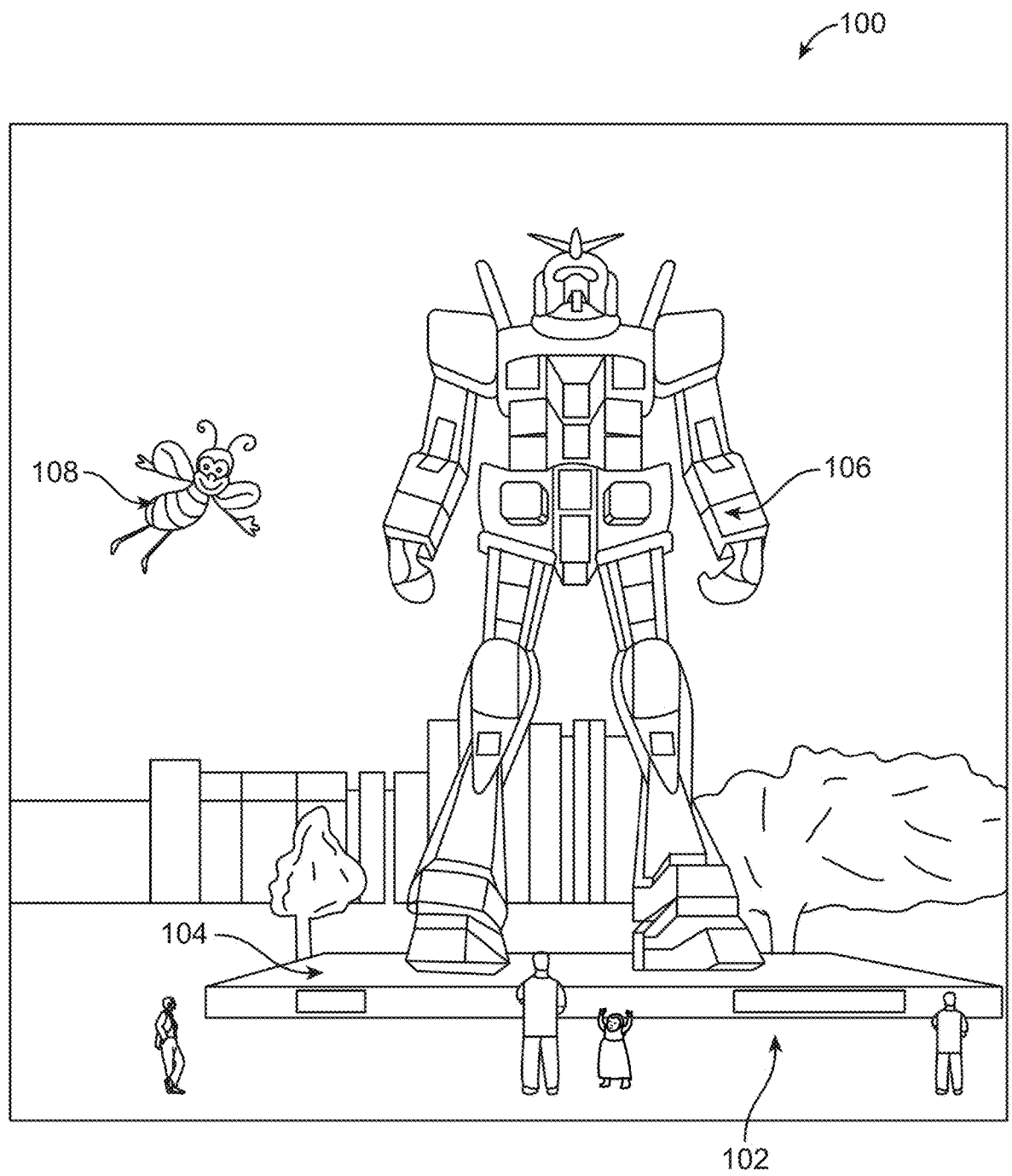
FIGS. 1A-1C illustrate approaches and devices for virtual and/or augmented reality devices.
Figure 1B:
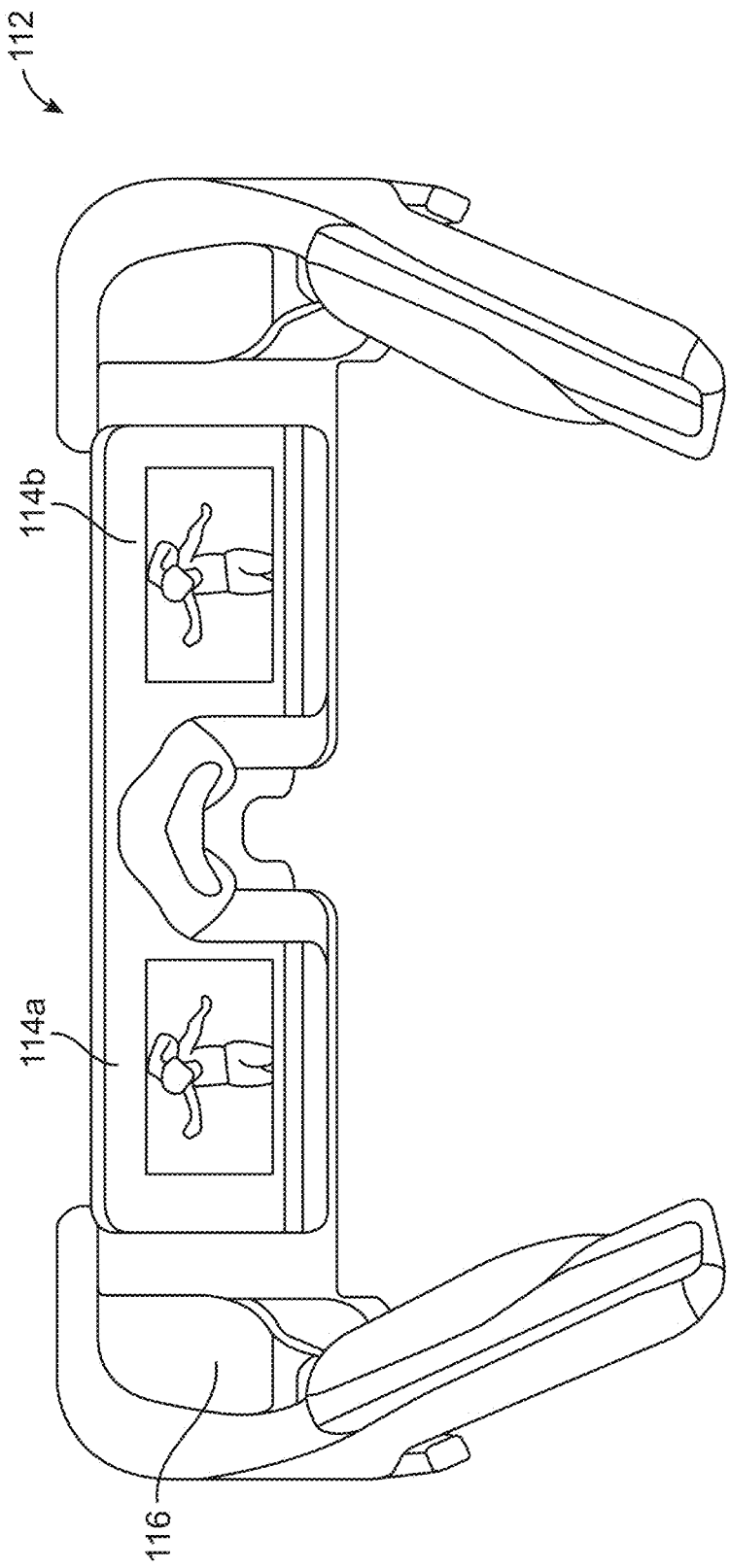
Figure 1C:
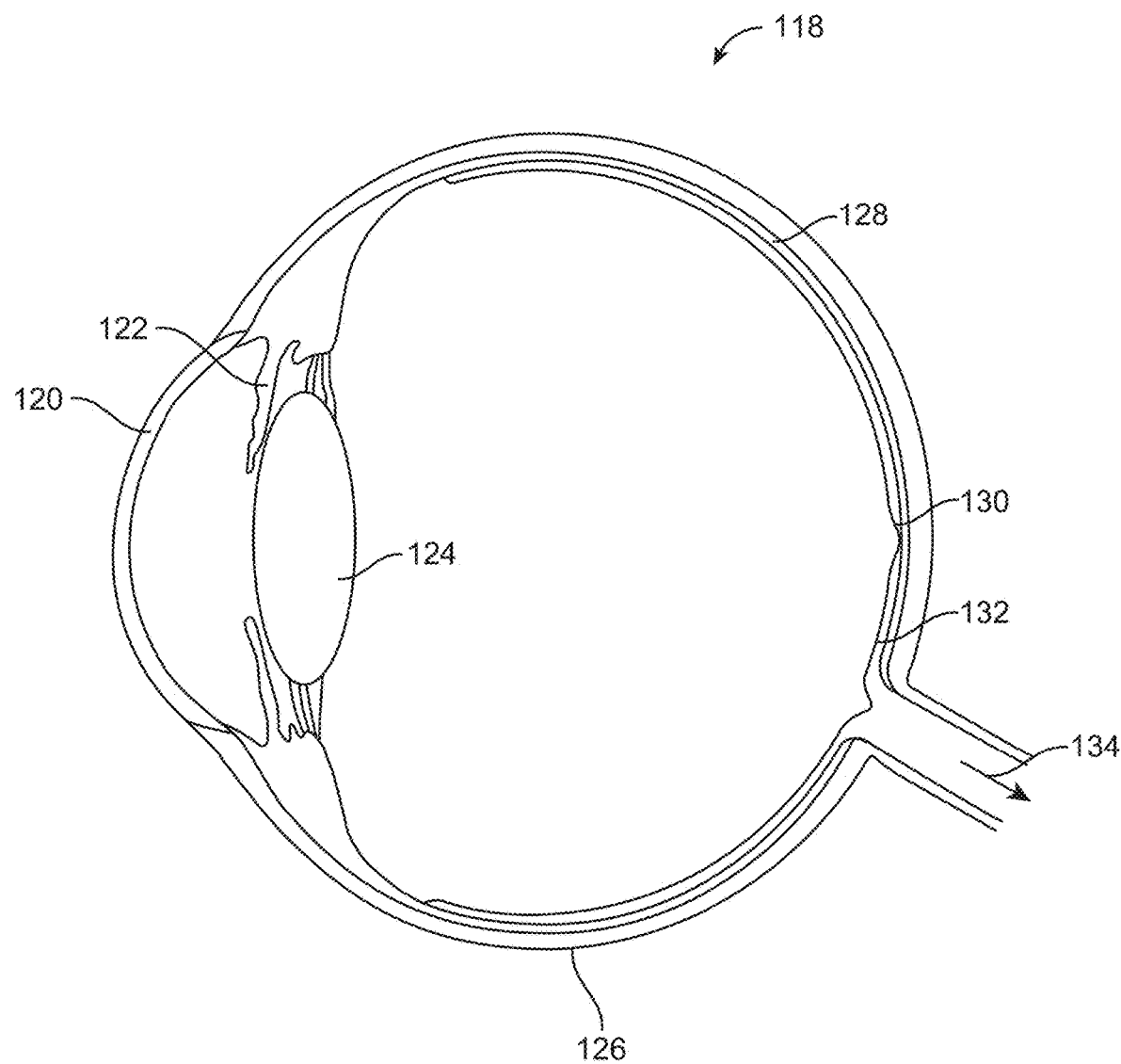

Various embodiments are described hereinafter with reference to the figures. It should be noted that the figures are not drawn to scale and that the elements of similar structures or functions are represented by like reference numerals throughout the figures. It should be noted that the figures are only intended to facilitate the description of the embodiments. They are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated.

Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments. In addition, for the purposes of illustration and explanation, the present disclosure is described in various embodiments in the context of enterprise applications. It is noted, however, that the invention is not limited in its scope to enterprise applications, and indeed, may be applied to other types of applications as well.

Before describing the examples illustratively depicted in the several figures, a general introduction is provided to further understanding. In some embodiments multi-depth image sequences may be generated using one or more light sources, which may be configured to shine light on a plurality of light modulators, which may further be configured to focus the light onto a voxel. In some embodiments, a voxel is a volumetric imaging area or point in three-dimensional space, which can be used to generate three-dimensional graphical objects. For instance, the robot statute 106 in FIG. 1A may be composed of one or more voxels, which taken together, allow the viewer to "see" the robot statute in space. The plurality of light modulators can focus the light onto voxels on one or more image planes at different depths. Further, the plurality of light modulators is able to raster through the voxels at different image depths to create image objects, which seem like they appear at different depths to the viewer.

Figure 2:
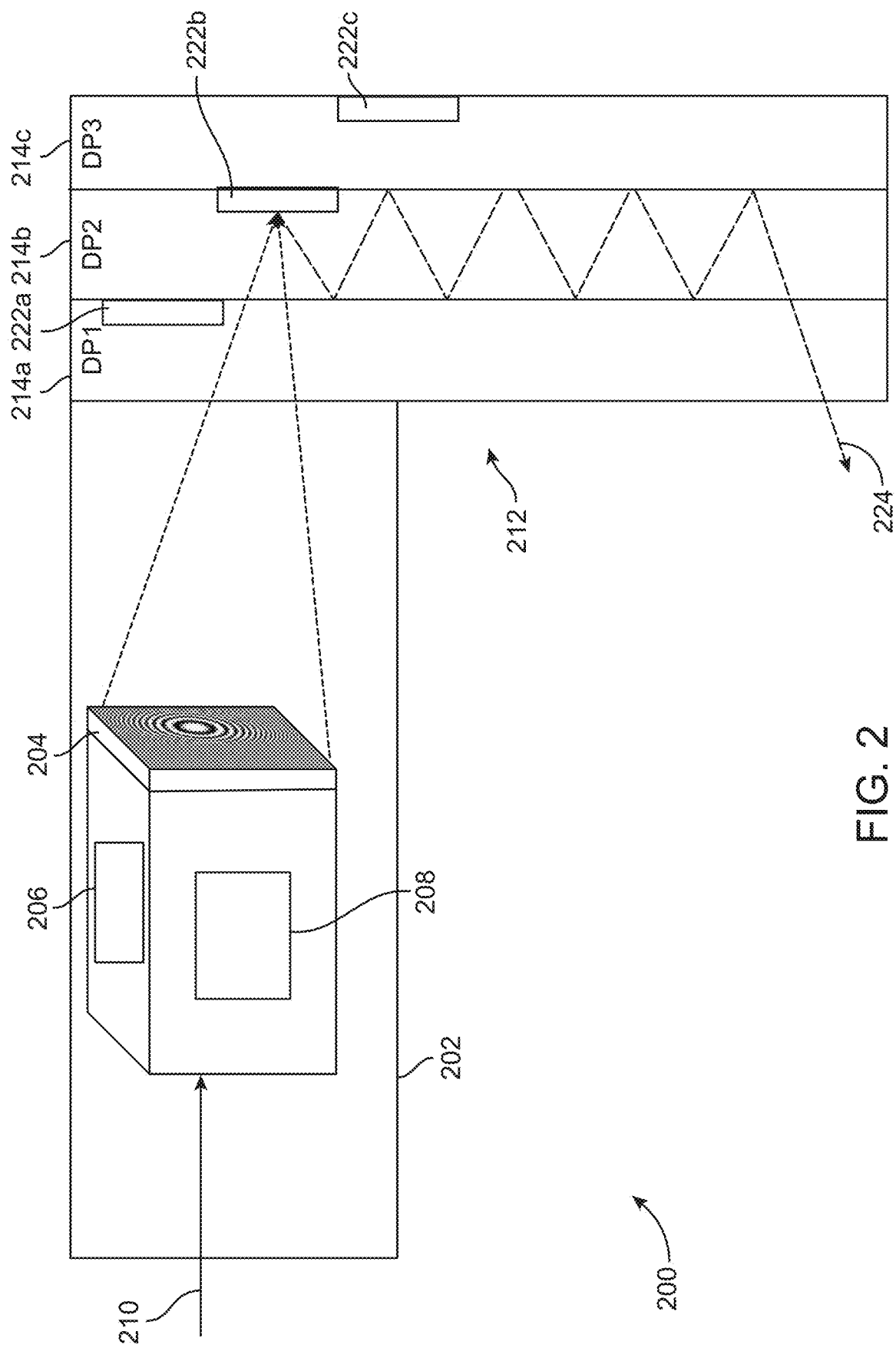
FIG. 2 illustrates a system for generating multi-depth image sequences comprising a dynamic Fresnel module and a DOE assembly, as according to some embodiments.

FIG. 2 illustrates a system 200 for generating multi-depth image sequences comprising a dynamic Fresnel module 202 and a DOE assembly 212, as according to some embodiments. The dynamic Fresnel module 202 may receive an input signal 210 that contains information for generating a multi-depth image sequence. For example, in some embodiments, the input signal 210 may comprise information for generating a robot statute 106 that appears to be at a distance of 100 meters, and information for generating a cartoon-like avatar character 108 that appears to be at a distance of 1 meter. In some embodiments, the input signal 210 is input into an array controller 206. The array controller may comprise a modulation array 204 and a logic module 208. As explained in further detail below, the modulation array 204 may comprise a plurality of light modulators (not depicted in FIG. 2) that focus or direct the light onto voxels or pixels to generate images. In some embodiments, the array controller module 206 comprises control code to manipulate and manage the plurality of light modulators. In some embodiments, the logic module 208 receives the input signal 210 or image information and interprets the image sequence information into instructions that the array controller 206 can follow to manipulate the modulation array 204 to raster multi-depth image sequences.

In some embodiments, the dynamic Fresnel module 202 may be optically coupled to a diffractive optical element (DOE) assembly 212. For example, the dynamic Fresnel module 202 and the DOE assembly 212 may be physically coupled to one another or physically coupled to one or more common structures. According to some embodiments, the DOE assembly 212 comprises one or more stacked planar waveguides or DOE layers 214a-214c with diffraction gratings 222a-222c (e.g. in-coupling grating—"ICG") that deflect the image light along the span of the waveguides 214a-214c and allow the image light 224 to exit the waveguide 214a-214c at angles that mimic natural real-world diffractive effects. Further, in some embodiments, the image light 224 exits the DOE layers 214a-214c towards a viewer using a second set of diffraction gratings (not depicted). In some embodiments, each DOE layer 214a-214c is configured to mimic light diffracting from objects at various distances. For example, DOE layer 214a may be configured to simulate diffracting light coming from objects (e.g., the cartoon-like avatar character 108) that are 1 meter away (e.g. depth-plane 1, "DP1", is set to 1 meter). Similarly, DOE layer 214b and DOE layer 214c may be configured to simulate diffracting light from coming from objects at different distances (e.g. depth-plane 2, "DP2", may be set to 100 meters; depth-plane 3, "DP3" may be set to optical infinity for far away objects).

More details about the DOE assembly and gratings are described in U.S. Provisional Patent Application Ser. No. 61/909,174, filed on Nov. 27, 2013 and entitled "Virtual and augmented reality systems and methods", as well as U.S. Provisional Patent Application Ser. No. 62/005,807, filed on May 30, 2014 and entitled "Methods and systems for virtual and augmented reality". The content of the aforementioned U.S. Provisional Patent applications is hereby expressly incorporated by reference for all purposes.

Figure 3A:
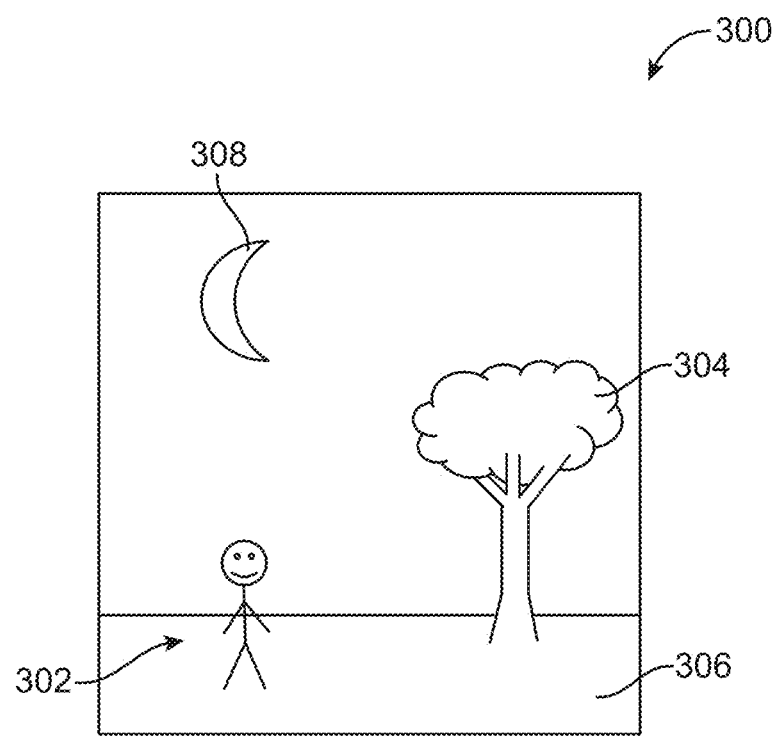
FIGS. 3A-3B illustrate a flat image with imaging objects in one plane, and a composite image with imaging objects separated into depth planes of different distances, as according to some embodiments.

FIG. 3A shows an illustrative example. There, a flat image 300 shows a man 302, a tree 304 which is rooted in the ground 306, and a moon 308 in the sky. In the real world, light diffracts or spreads out as it travels. Thus, light reflected from far away objects, such as the moon 308, has spread out more than light reflected from closer objects, such as the man 302. As explained above, the human vision system handles light coming from far and near objects in at least two ways (1) by line of sight adjustments (e.g. vergence movements), and (2) by focusing. For instance, when viewing the moon in the real world, the eyes adjust by converging each eye's line of sight to cross where the moon is located. (Similarly, if one stares at the tip of his/her own nose, the eyes will again adjust converging each eye's line of sight to cross where the tip of the nose is located and the subject will outwardly appear "cross-eyed".)

In addition to adjusting lines of sight, each eye must focus its lensing system to account for the spreading out of light. For instance, the light reflected from the far-away moon 308 may appear more "blurry" than the light reflected from the man 302 if not focused. Thus, to view the moon, each eye focuses its lens by flattening it out to refract the moonlight less and less, which will eventually bring the moon into focus. Similarly, to view the man each eye focuses its lens by making it more round to increasingly refract the incident light until the man comes into focus. As explained above, adjusting each eye's line of sight and focusing occur together automatically and is known as the "accommodation-vergence reflex."

An issue with conventional/legacy stereoscopic AR or VR configurations is that they work against the accommodation-vergence reflex. For example, referring to the flat image 300 in FIG. 3A, if a conventional/legacy stereoscopic AR or VR system displays the moon 308, the tree 304, and the man 302 at different perceived distances (e.g. the man appears closer and the moon appears farther), but all in-focus, then the eyes do not need to refocus when looking at the moon or the man. This causes a mismatch that works against the accommodation-vergence reflex. As mentioned, these sorts of legacy approaches are known to produce eye fatigue, headaches, or other forms of discomfort in users.

Figure 3B:
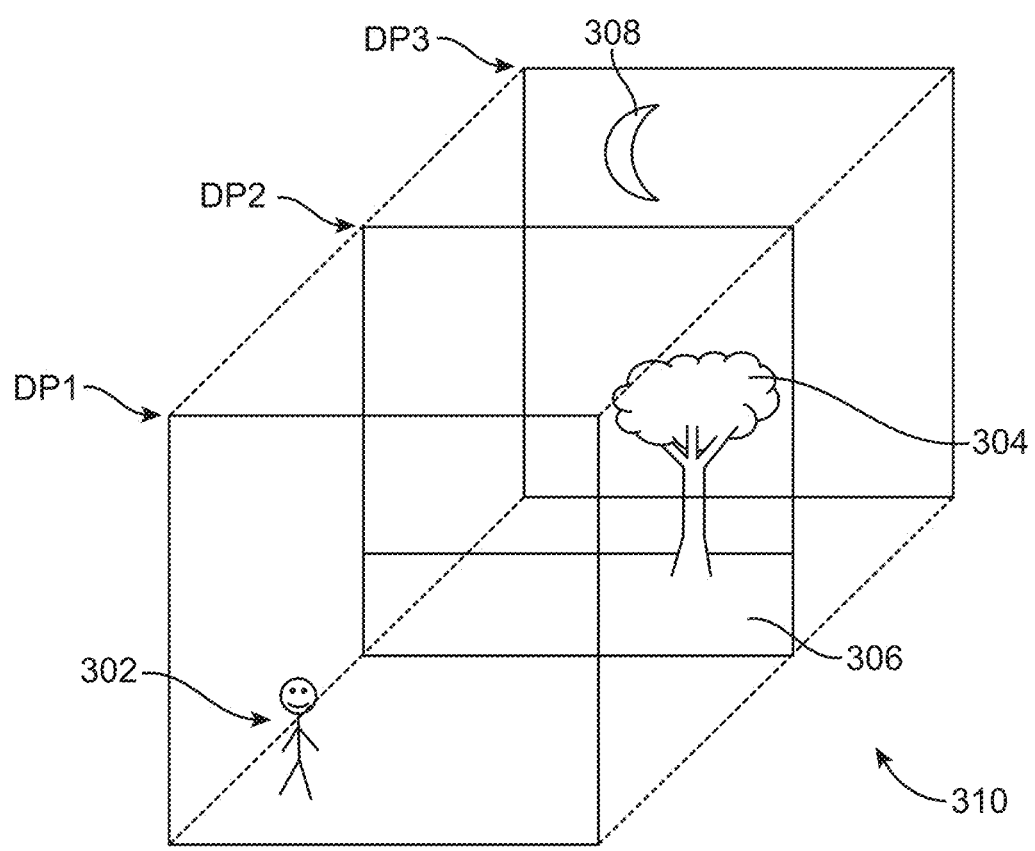

In contrast, the multi-depth system 200 works with the human accommodation-vergence reflex by displaying near and far away objects in different depth planes. For example, FIG. 3B shows the same flat image 300 (e.g. the man 302, the tree 304, the ground 306, and the moon 308) broken up into three example depth planes, DP1, DP2, DP3, to form a depth composite image 310. The object that is intended to be closest, the man 320, is displayed in depth plane 1 (DP1), which has been tuned to mimic light spreading out from objects 1 meter away. The middle objects, the tree 304 and the ground 306, are displayed in depth plane 2 (DP2), which has been tuned to mimic light spreading out from objects 5 meters away. Finally, the farthest object, the moon 308, is displayed in depth plane 3 (DP3), which has been tuned to mimic light spreading out from objects 384,400,000 meters away. (384,400,000 meters is the approximate distance from the Earth to the Moon. However, for objects past a certain distance it is common to simply adjust the imaging system, such as a lensing system, to optical infinity, whereby the incident light rays are approximated as nearly parallel light rays.) In this way, a viewer of the depth composite image 310 must adjust both his/her focusing and line of sight convergence when looking at the objects in the different depth planes, and no headaches or discomfort will occur. Further, to generate an image sequence or animation, one depth plane may be rastered or modified while the objects in the other depth planes are held constant. For example, while the tree 304, ground 306, and moon 308 are held constant in their respective depth layers, image data corresponding to the man 302 in depth layer 1 can updated multiple times a second, so that the man appears "animated" and, for example, can jump up towards the moon 308 (from the perspective of the viewer), or walk over in front of the tree 304.

Figures 4A, 4B, 4C:
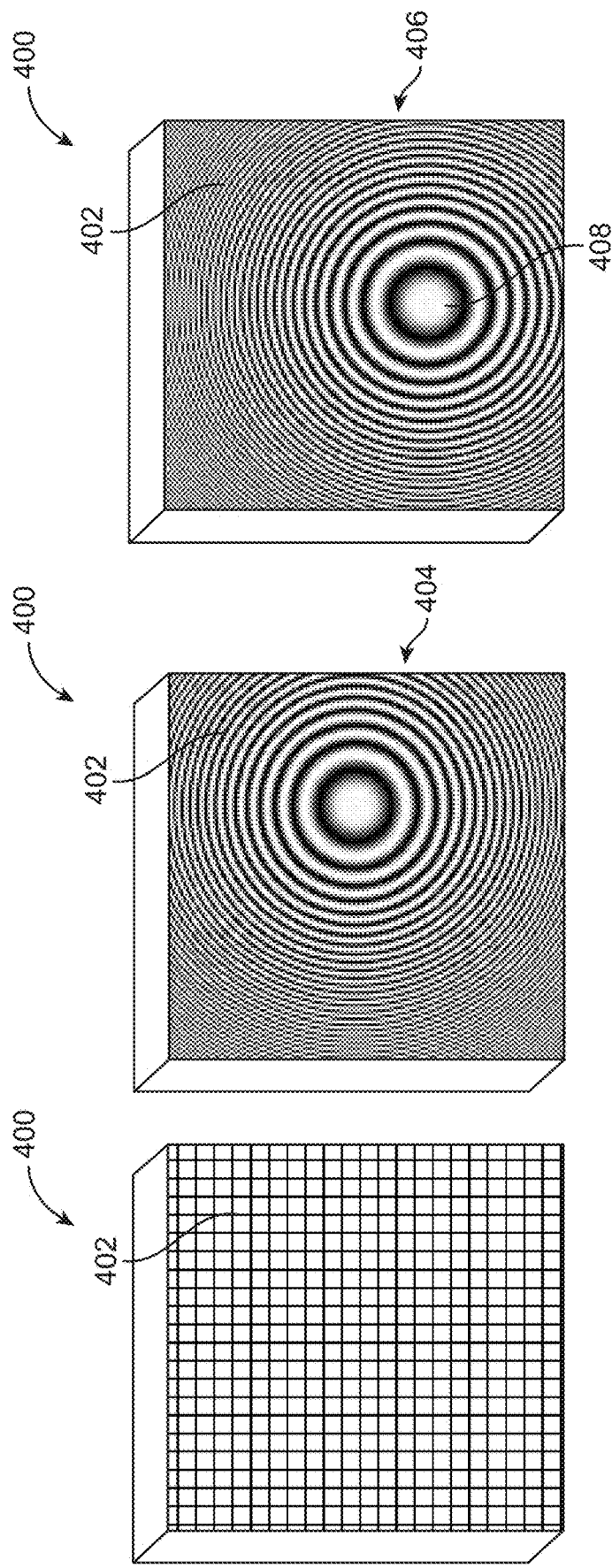
FIGS. 4A-4C illustrate modulation arrays, light modulators, and modulation shift patterns, as according to some embodiments.

FIG. 4A illustrates a modulation array 400, according to some embodiments. The modulation array 400 may be comprised of a plurality of light modulators 402. The light modulators 402 are configured to modulate incident light (e.g. electromagnetic waves) that falls upon the face of the array (e.g. the faces of the plurality of light modulators 402). Although the plurality of light modulators 402 in FIG. 4A are illustrated as a certain size (in relation to the total height or width of the modulation array 400), one of ordinary skill in the art appreciates that the modulators can be increased or decreased in size and distance from one another (e.g. pitch, dot pitch) to increase or decrease resolution accordingly. FIG. 4B illustrates a modulation array 400, with a representative modulation shift pattern 404 assigned to a plurality of light modulators. In some embodiments, the light bands in the modulated shift pattern 404 correspond to a 180-degree phase shift (e.g. shifting the incident light 180-degrees) and the dark bands correspond to a 0-degrees phase shift (e.g. shifting the incident light 0-degrees), intervening gray values correspond to shift values between 180-degrees and 0-degrees. The spacing between each of these bands may be adjusted such that constructive interference is created between components of reflected light at the desired focal point.

As illustrated, the modulated shift pattern 404 focuses light incident upon the modulation array 400 to a certain imaging area or voxel. Whereas, for instance, the modulated shift pattern 406 (which shows a focal or center portion lower than modulated shift pattern 404) focuses light incident upon the modulation array 400 to a different voxel. Accordingly, by changing the modulated shift patterns the modulation array can focus incident light to different voxels. In this way, the modulation array 400 may function as a dynamic Fresnel lens.

Figure 5A:
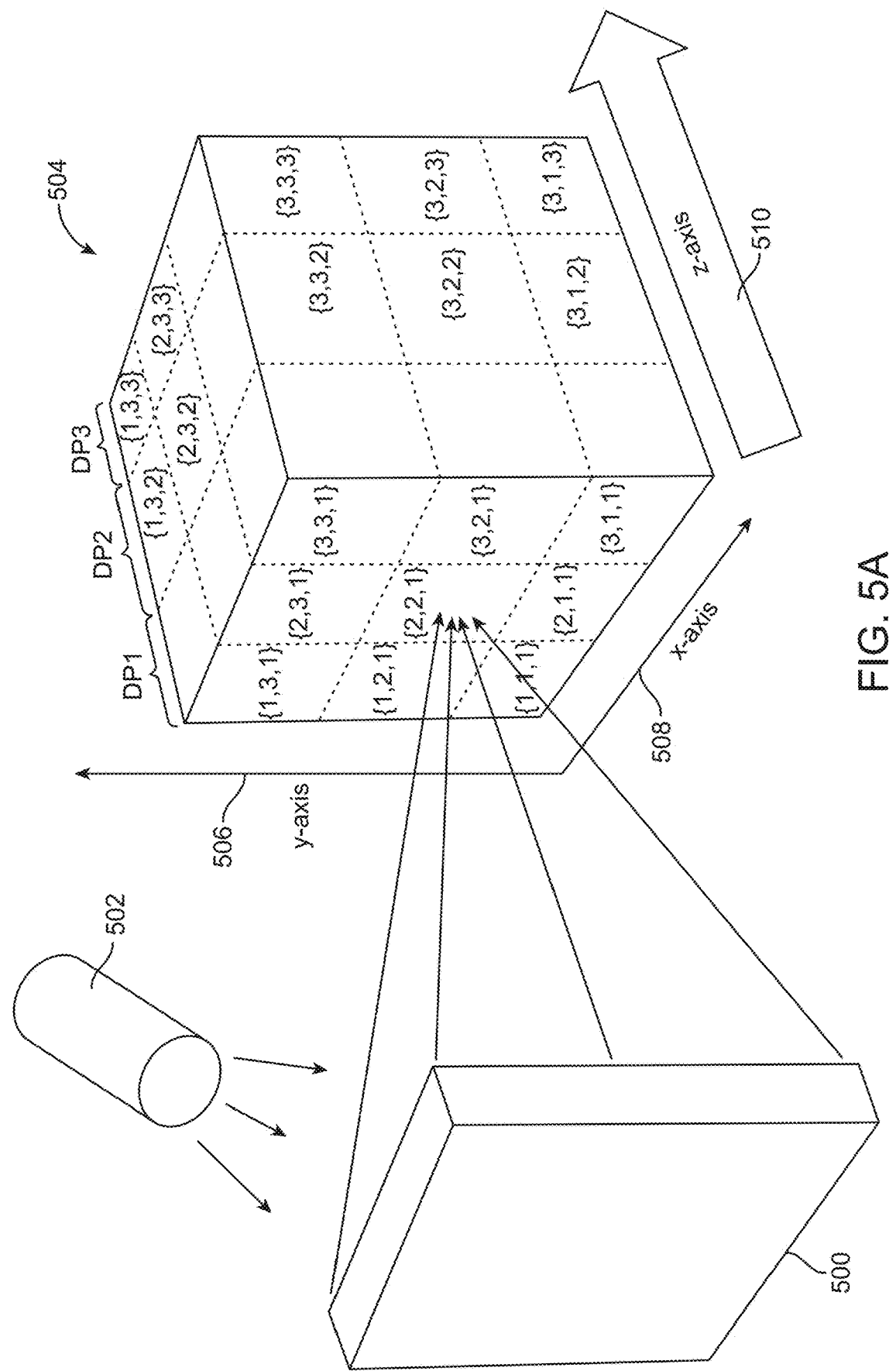
FIGS. 5A-5C illustrate a light source and modulation array generating voxels, as according to some embodiments.

FIG. 5A illustrates a light source 502 shining light on a modulation array 500, which is focusing light onto a voxel {2, 2, 1}, as according to some embodiments. In some embodiments, the light source 502 may be configured to project a beam of light onto at least a portion of the modulation array 500. The light source 502 may be configured to actively or passively shape the projected beam of light so as to reflect off of the surface of the modulation array 500 or specific portions thereof and, in some embodiments, may function as a point light source. In particular, the light source 502 may comprise a laser diode, projector, LED, fiber optics, or other sources of beams of light or guided electromagnetic radiation, as are known in the art. A three dimensional imaging area 504 is illustrated as comprising a plurality of voxels, denoted by their relative location with respect to the x-axis 508, y-axis 506, and z-axis 510. For instance, as illustrated, the modulation array 500 is focusing light onto a voxel {2, 2, 1}, which has an x-value of 2 (e.g. "2 over"), y-value of 2 (e.g. "2 up"), and a z-value of 1 (e.g. "1 back"). In some embodiments, the size of the voxels is proportional to the distribution and size of the plurality of the light modulators 402 in the modulation array 500. For instance, if smaller voxels are required for higher resolution, the number and size of the light modulators 402 may be increased; similarly, in some embodiments, the distance between the light modulators (e.g. pitch) may be decreased to increase resolution in some embodiments.

Figure 5B:
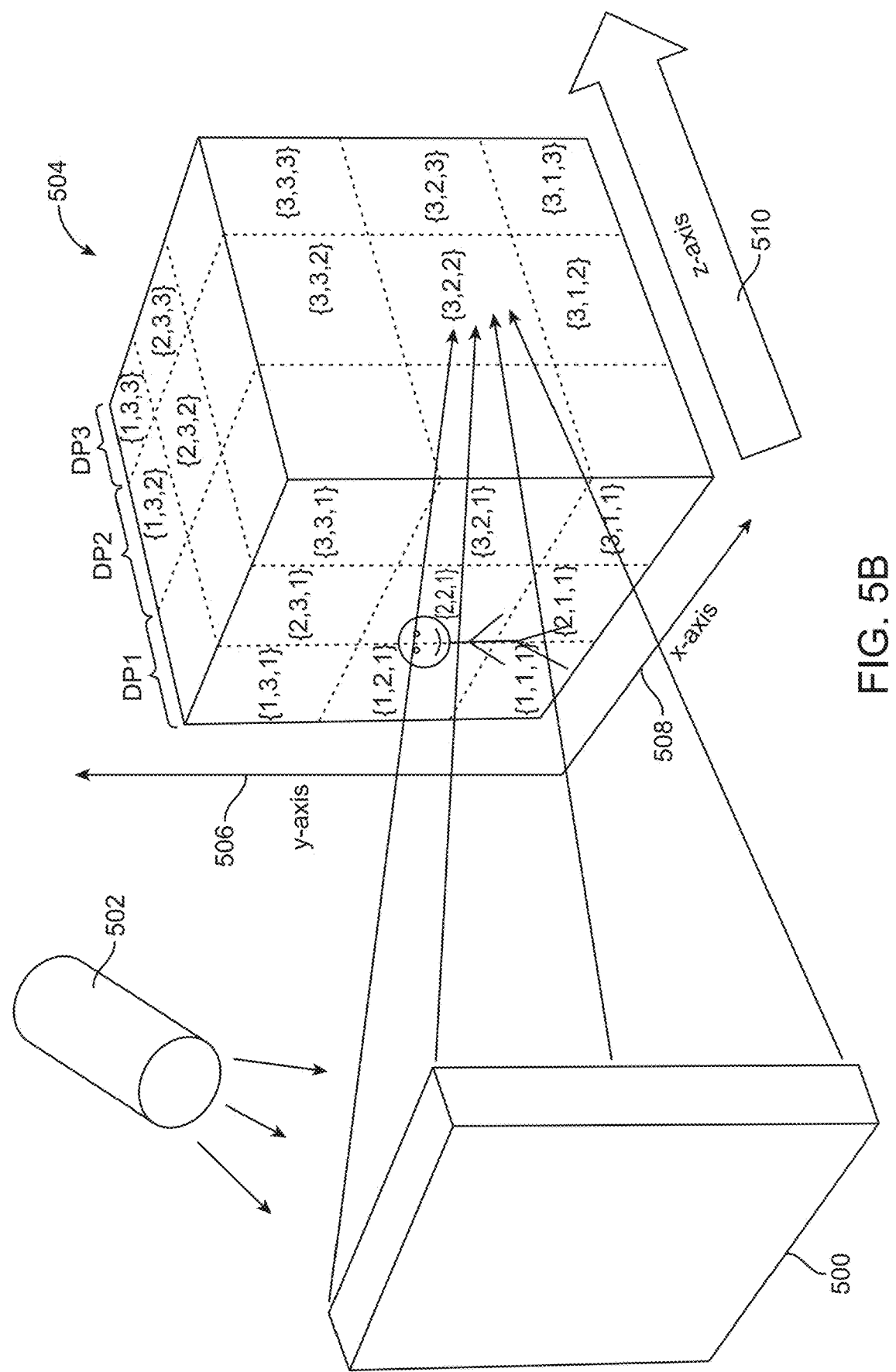

FIG. 5B illustrates a light source 502 shining light on a modulation array 500, which is focusing light onto a different voxel {3, 2, 2}. By changing its modulation shift patterns the modulation array 500 can not only focus light on different voxels in the X and Y dimensions, but voxels located at different z distances as well. Thus, the voxels in the first z-layer (where the third voxel, z, values are all "1", e.g. {_, _, 1}) may correspond to imaging objects in the DP1 depth plane. Similarly, the voxels in the second z-layer (e.g. {_, _, 2}) may correspond to imaging objects in the DP2 depth plane and the voxels in the third z-layer (e.g. {_, _, 3}) may correspond to imaging objects in the DP3 depth plane. Accordingly, the man 302 from the depth composite image 310 in FIG. 3B may be rastered in the first z-layer, the tree 304 and the ground 306 may be rastered in the second z-layer, and the moon in the third z-layer. In some embodiments, an image is rastered by illuminating voxel by voxel. For example, to raster the man 302 the modulation array 500 may first generate the voxel for {1, 1, 1} (which in FIG. 5B contains the man's right leg and foot) using a first modulation shift pattern, then generate the voxel for {2, 1, 1} (which in FIG. 5B contains the man's left leg and foot) using a second modulation shift pattern. In some embodiments, where there are no imaging objects in a voxel the modulation array may skip the voxel. Thus, for instance, voxel {3, 1, 1}, which does not contain any part of the man 302 to be imaged, may be skipped to save time and resources of the imaging system. In some embodiments, each voxel may be generated whether or not it contains an object (e.g. objects) to be imaged. Thus, in some embodiments, voxel {3, 1, 1} may still be focused on, but a background value may be projected instead or no light at all projected.

Figure 5C:
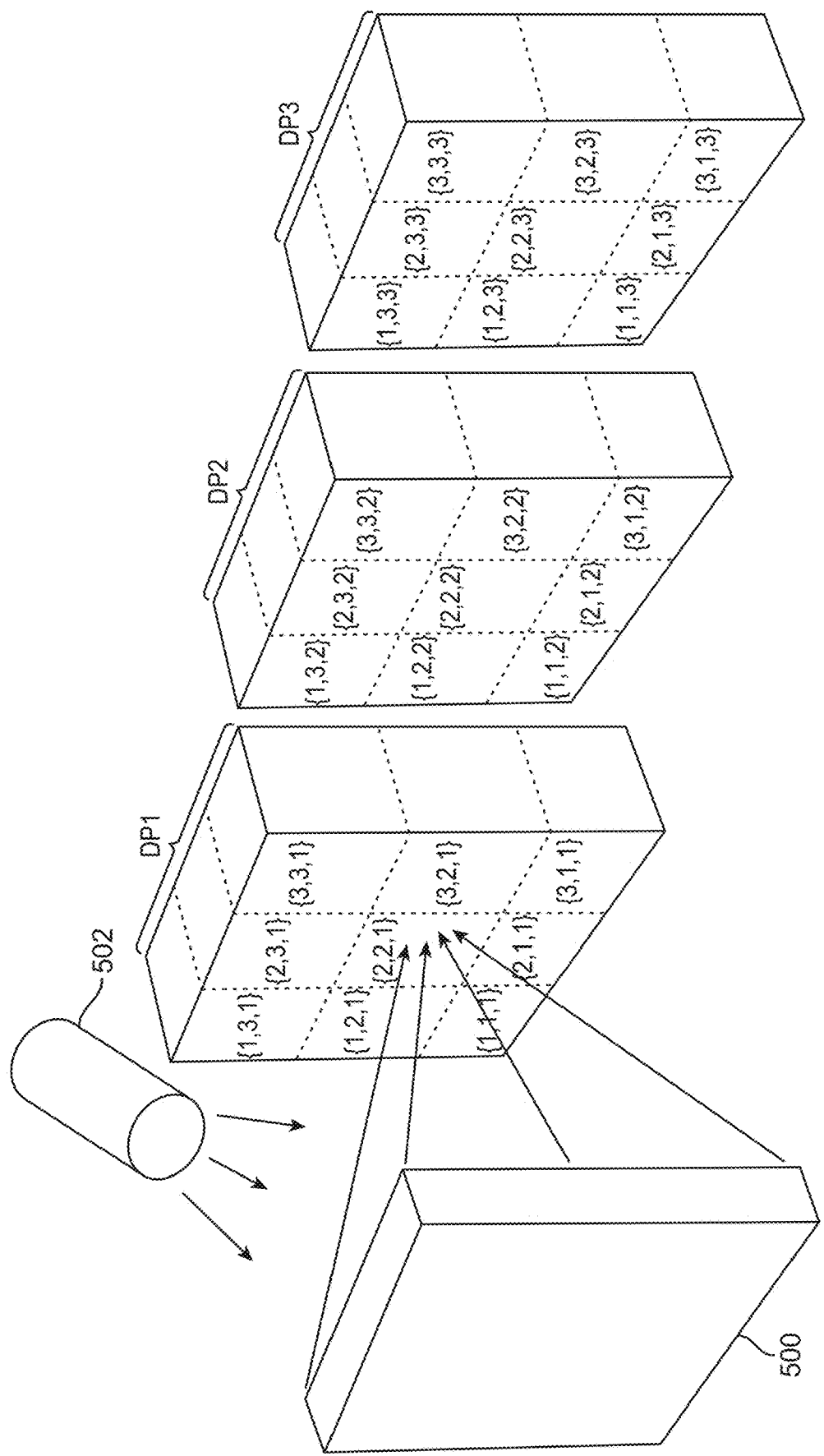

FIG. 5C illustrates a modulation array 500 with three depth planes (e.g. DP1, DP2, and DP3), as according to some embodiments. In particular each depth plane has been configured so they are not aligned. In this configuration, the depth planes may correspond to in-coupling gratings shown in FIG. 2. For instance, the voxels in DP1 in FIG. 5C may correspond to in-coupling grating 222a, the voxels in DP2 in FIG. 5C may correspond to in-coupling grating 222b, and the voxels in DP3 in FIG. 5C may correspond to in-coupling grating 222c.

Though FIG. 5A-5C illustrates each depth plane as a 3×3 voxel matrix or tensor, one of ordinary skill in the art appreciates that the number and size of the voxels can be increased to generate final image outputs of the desired resolution. Further, though one light source (e.g. light source 502) is illustrated in the figures, one of ordinary skill in the art appreciates the one or more light sources may be implemented. In some embodiments, three light sources—one red light, one green light, and one blue light—may be implemented to generate RGB voxel values, which in turn may be rastered to generate a color multi-depth image sequence. In some embodiments, three modulation arrays are implemented, one per color, such that they work in concert to image one three-channel voxel with RGB color space values. In some embodiments, one partitioned modulation array is implemented, wherein different sections of the modulation array display different modulation shift patterns. In some embodiments, the partitioned modulation array may have three partitions, where each partition is configured to receive light of a different color.

Figure 6:
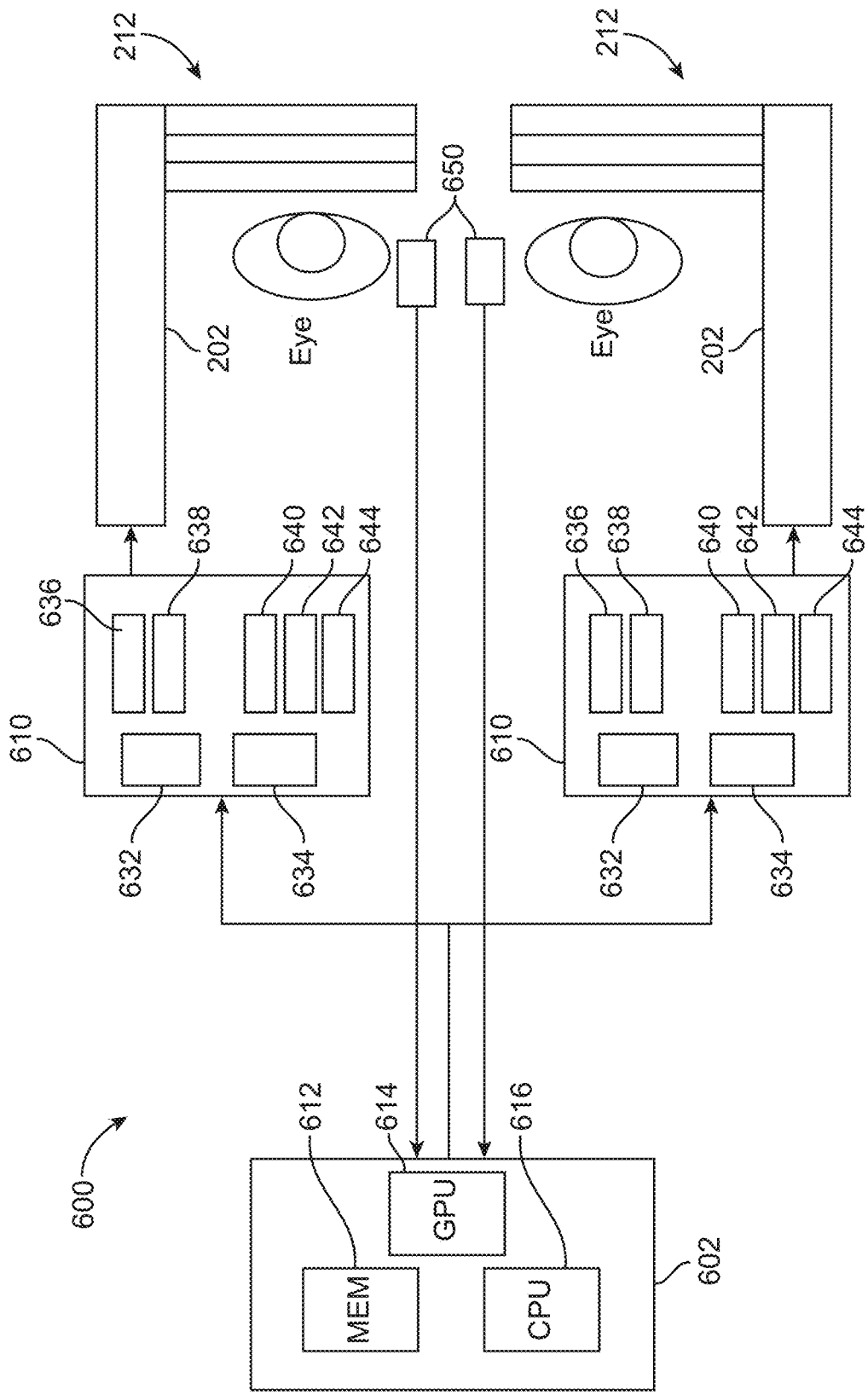
FIG. 6 illustrates an imaging system architecture in which a dynamic Fresnel module may be implemented, as according to some embodiments.

FIG. 6 illustrates an example AR system implementing a DOE assembly 212 and the dynamic Fresnel module 202, as according to some embodiments. As illustrated, the system includes an image generating processor 602, with a memory 612, a CPU 616 and a GPU 614 and other circuitry for image generating and processing. The image generating processor 602 may be programmed with the desired virtual content for presentation to the AR system user. It should be appreciated that in some embodiments, the image generating processor 602 may be housed in the wearable AR system. In other embodiments, the image generating processor and other circuitry may be housed in a belt pack that is coupled to the wearable optics.

The virtual content or information generated by the image generating processor 602 may be transmitted to display circuitry 610. The display circuitry 610 may comprise interface circuitry 632 that may be in communication with the image generation processor 602, and may further interface with circuitry such as a maxim chip 634, a temperature sensor 636, a piezoelectric drive/transducer 638, a red light source 640, a blue light source 642, and a green light source 644. In some embodiments a fiber combiner combines the generated lights and uses a fiber (not depicted) to route the light to the face of a modulation array in the dynamic Fresnel module 202. However, as explained, in some embodiments, the light sources may be integrated into the dynamic Fresnel module 202, which may have its own dedicated control circuitry to receive image information and project light from one or more light sources on the modulation array. The AR system may then use a dynamic Fresnel module 202 to generate the voxels and direct light to one or more gratings in the DOE assembly 212.

System Architecture Overview

Figure 7:
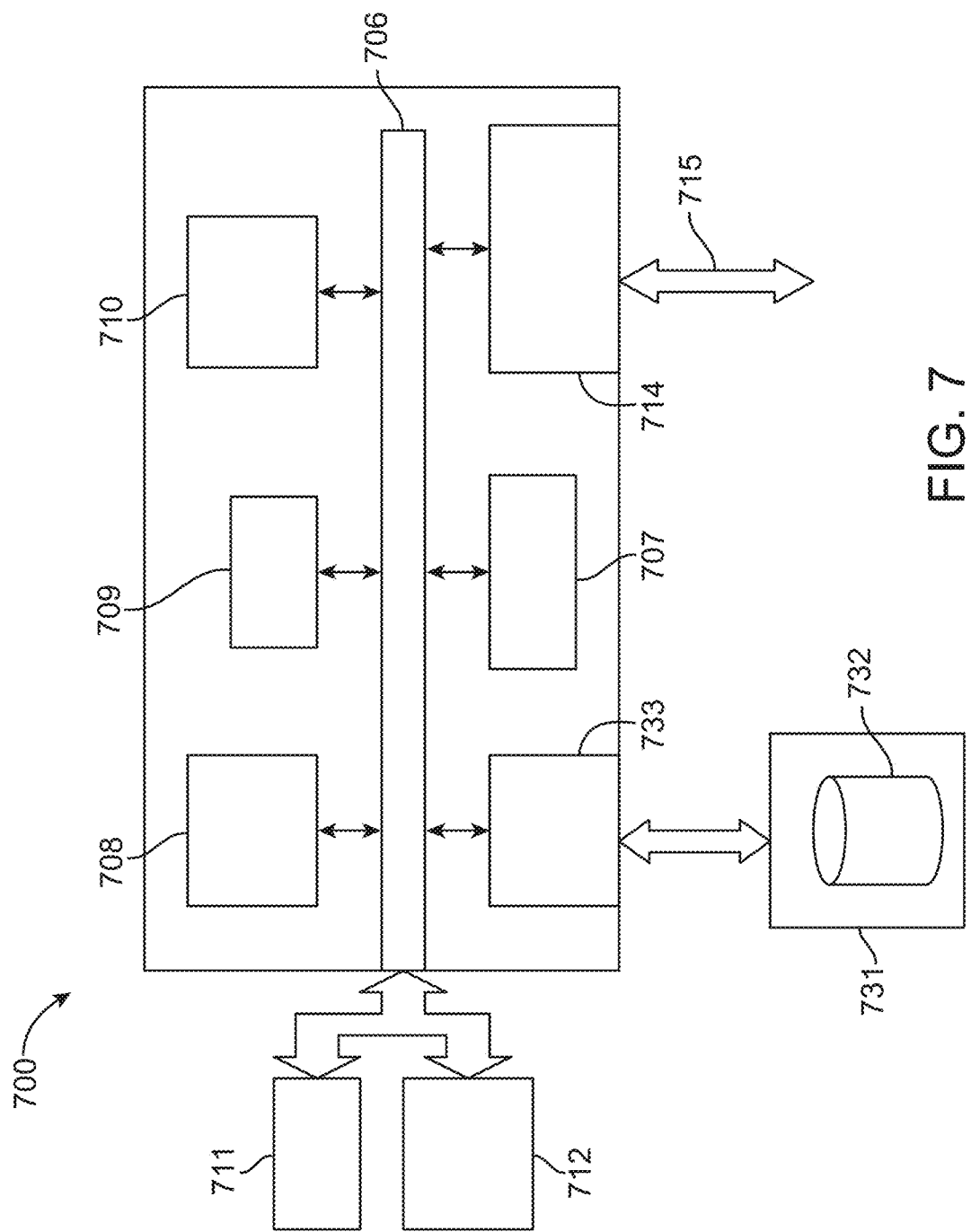
FIG. 7 illustrates an example system architecture, as according to some embodiments.

FIG. 7 is a block diagram of an illustrative computing system 700 suitable for implementing embodiments of the invention described herein. Computer system 700 includes a bus 706 or other communication mechanism for communicating information, which interconnects subsystems and devices, such as processor 707, system memory 708 (e.g., RAM), static storage device 709 (e.g., ROM), disk drive 710 (e.g., magnetic or optical), communication interface 714 (e.g., modem or Ethernet card), display 711 (e.g., CRT or LCD), input device 712 (e.g., keyboard), and cursor control.

According to one embodiment of the invention, computer system 700 performs specific operations by processor 707 executing one or more sequences of one or more instructions contained in system memory 708. Such instructions may be read into system memory 708 from another computer readable/usable medium, such as static storage device 709 or disk drive 710. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 707 for execution. Such a medium may take many forms, including but not limited to, non-volatile media and volatile media. Non-volatile media includes, for example, optical or magnetic disks, such as disk drive 710. Volatile media includes dynamic memory, such as system memory 708.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM (e.g., NAND flash, NOR flash), any other memory chip or cartridge, or any other medium from which a computer can read.

In an embodiment of the invention, execution of the sequences of instructions to practice the invention is performed by a single computer system 700. According to other embodiments of the invention, two or more computer systems 700 coupled by communication link 715 (e.g., LAN, PTSN, or wireless network) may perform the sequence of instructions required to practice the invention in coordination with one another.

Computer system 700 may transmit and receive messages, data, and instructions, including program, i.e., application code, through communication link 715 and communication interface 714. Received program code may be executed by processor 707 as it is received, and/or stored in disk drive 710, or other non-volatile storage for later execution. Database 732 in storage medium 731 may be used to store data accessible by system 700 via data interface 733.

Various portions of the modulation array of a dynamic Fresnel projector can act like one or more flat Fresnel lenses. Instead of a curved surface as in a conventional lens, an exemplary Fresnel lens has grooves or ridges that manipulate characteristics (e.g., phase, amplitude, direction, etc.) of light interacting with (e.g., passing through and/or reflecting off) the Fresnel lens just like a conventional lens. Fresnel lenses are Fourier lenses. The modulation arrays of dynamic Fresnel projectors have the ability to modulate light in phase or amplitude by forming one or more Fresnel lenses. Examples of modulation arrays that may be used in one or more of the embodiments described herein include liquid crystal on silicon ("LCOS") modules, as well as one or more modules that are at least in part formed by electro-optical materials.

Voxel-by-Voxel Systems

Figure 8:
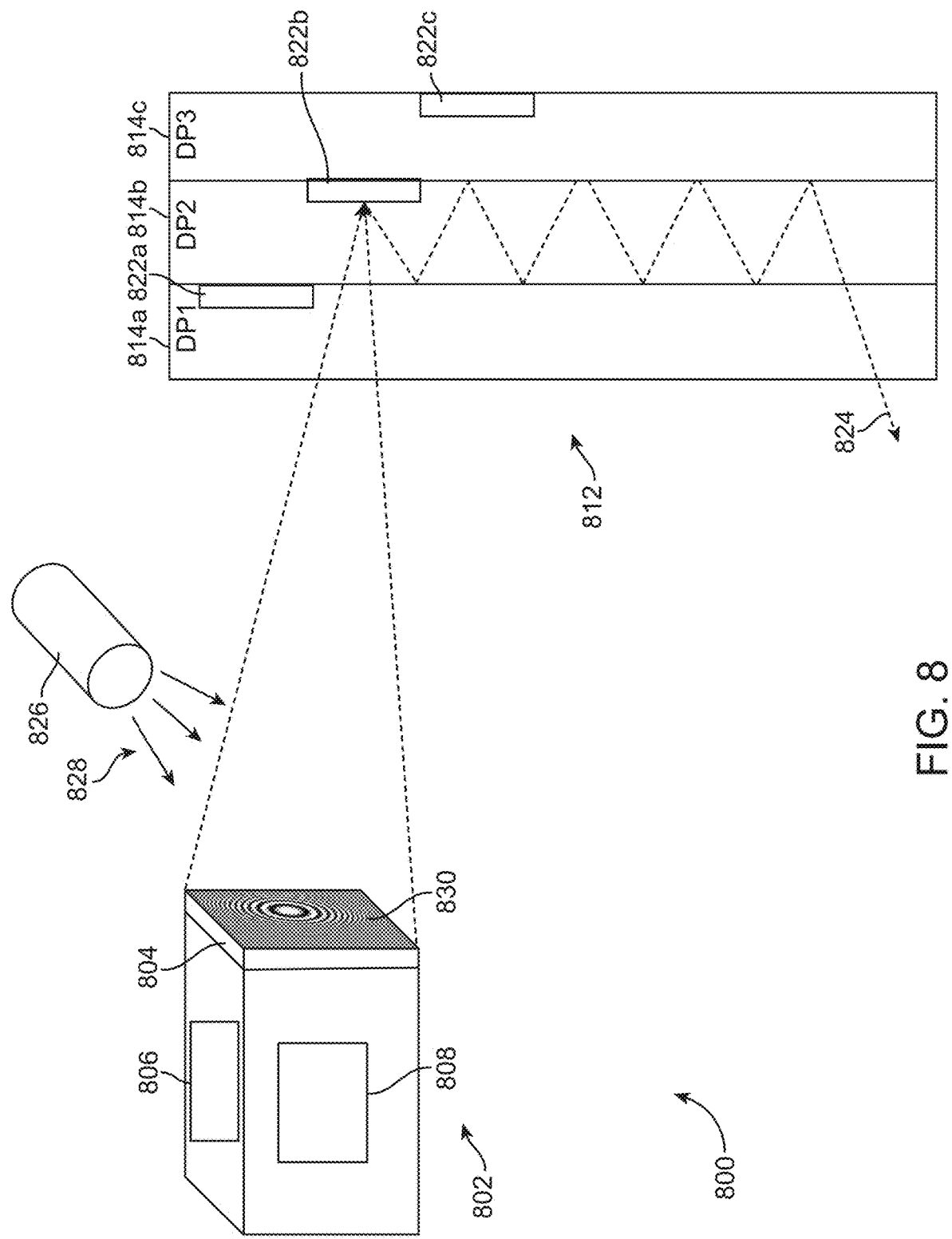
FIGS. 8-11 illustrate various systems for generating multi-depth image sequences comprising a dynamic Fresnel module and a DOE assembly, as according to some embodiments.

FIG. 8 illustrates a system 800 for generating multi-depth image sequences comprising a dynamic Fresnel module 802 and a DOE assembly 812, as according to some embodiments. The dynamic Fresnel module 802 reflects and focuses light 828 from a light source 826. In some embodiments, the dynamic Fresnel module 802 may be at least partially formed of an electro-optical material. For example, the dynamic Fresnel module 802 may include indium phosphide materials having properties that enable Fresnel patterns to be refreshed at rates in the GHz range. In other embodiments, the dynamic Fresnel module 802 may be an LCOS module.

At any given point in time, the light 828 may correspond to a particular portion (e.g., a voxel) of a multi-depth image sequence. More specifically, various characteristics of the light 828, such as color and intensity, may correspond to the color and intensity of the voxel of the multi-depth image sequence to be displayed. As such, the color and intensity of the light 828 may be adjusted on a voxel-by-voxel basis over the course of the raster scan. In this way, the light 828 may be a dynamic light stream in which light characteristics (color, intensity, etc.) changes over time. For example, in a scenario where a robot statue 106 is to be displayed, the light 828 may, at any given point in time over the course of the raster scan, correspond to a voxel forming part of an image of a robot statute 106 that appears to be at a distance of 100 meters. In this example, the color and intensity of the light 828 may change such that each voxel of the image of the robot statute 106 is displayed in an accurate manner. In another example in which a cartoon-like avatar character is to be displayed, the light 828 may, at any given point in time over the course of the raster scan, correspond to a voxel forming part of a cartoon-like avatar character 108 that appears to be at a distance of 1 meter.

In some embodiments, an input signal corresponding to the light 828 is received at an array controller 806. The input signal synchronizes the characteristics of the light 828 from the light source 826 with the dynamic Fresnel module 802 to project the light 828 toward an appropriate location to form the desired voxel. The array controller may comprise a modulation array 804 and a logic module 808. As explained above, the modulation array 804 may comprise a plurality of light modulators (not depicted in FIG. 8) that focus or direct the light onto voxels or pixels to generate images or portions thereof. The modulation array 804 may have 1-bit addressing (e.g. binary), as explained below. In some embodiments, the array controller module 806 comprises control code to manipulate and manage the plurality of light modulators. In some embodiments, the logic module 808 receives the input signal or image information and interprets the image sequence information into instructions that the array controller 806 can follow to manipulate the modulation array 804 to raster multi-depth image sequences. In some embodiments, some or all of the functionality of the array controller 806 and the logic module 808 may be provided by way of one or more modules that are logically and/or physically separate from the dynamic Fresnel module 802, such as circuitry housed within a belt pack that is coupled to wearable optics, one or more cloud computing devices, and the like.

In some embodiments, the dynamic Fresnel module 802 may be optically coupled to a diffractive optical element (DOE) assembly 812. For example, the dynamic Fresnel module 802 and the DOE assembly 812 may be physically coupled to one another or physically coupled to one or more common structures. According to some embodiments, the DOE assembly 812 comprises one or more stacked planar waveguides or DOE layers 814a-814c with diffraction gratings 822a-822c (e.g. ICG) that deflect the image light along the span of the waveguides 814a-814c and allow the image light 824 to exit the waveguide 814a-814c at angles that mimic natural real-world diffractive effects. Further, in some embodiments, the image light 824 exits the DOE layers 814a-814c towards a viewer using a second set of diffraction gratings (not depicted). In some embodiments, each DOE layer 814a-814c is configured to mimic light diffracting from objects at various distances. For example, DOE layer 814a may be configured to simulate diffracting light coming from objects (e.g., the cartoon-like avatar character 108) that are 1 meter away (e.g. depth-plane 1, "DP1", is set to 1 meter). Similarly, DOE layer 814b and DOE layer 814c may be configured to simulate diffracting light from coming from objects at different distances (e.g. depth-plane 2, "DP2", may be set to 100 meters; depth-plane 3, "DP3" may be set to optical infinity for far away objects).

In FIG. 8, light 826 that reflects off of the modulation array 804 (having a Fresnel pattern 830 thereon) focuses to a particular target point (e.g., voxel) in 3-D space. The Fresnel pattern 830 is configured to focus light 826 from the known location of the light source 826 to image light 824 at the target voxel. Changing the Fresnel pattern 830 moves the location of the target voxel. By rapidly changing the Fresnel pattern 830 on the modulation array 804, the dynamic Fresnel module 802 functions as a voxel rastering projector that generates 3-D images voxel-by-voxel.

Frame-by-Frame Systems

Figure 9:
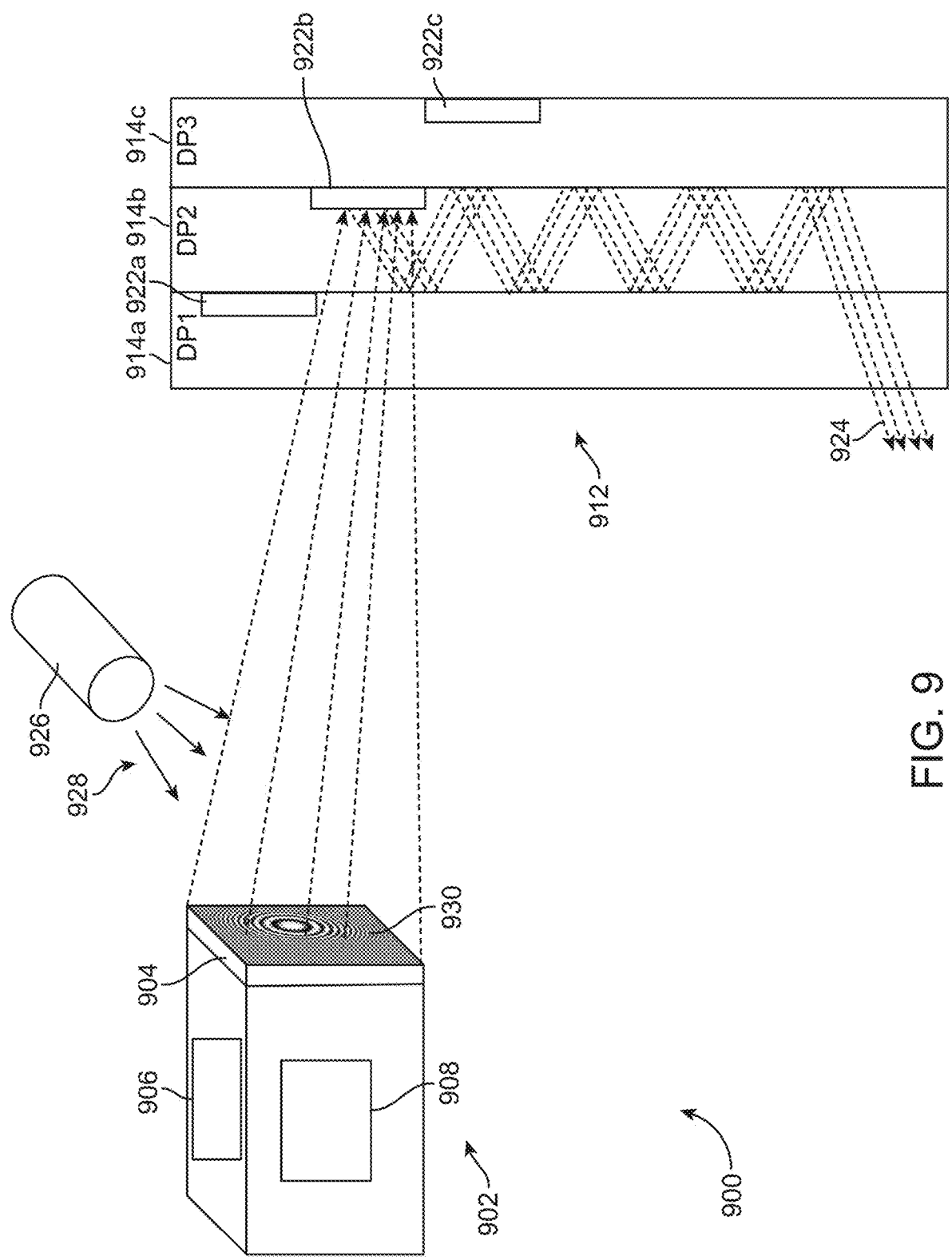

FIG. 9 illustrates a system 900 for generating multi-depth image sequences comprising a dynamic Fresnel module 902 and a DOE assembly 912, as according to some embodiments. The system 900 depicted in FIG. 9 is similar to the system 800 depicted in FIG. 8. The basic difference between the two systems 800, 900 is that, instead of the voxel-by-voxel rastering of the system 800 depicted in FIG. 8 to form a 3-D image, the system 900 depicted in FIG. 9 projects complete 3-D images toward waveguides 914a-914c. In order to project entire images, the Fresnel pattern 930, instead of being a simple Fresnel pattern 830 as in FIG. 8, is a Computer Generated Hologram ("CGH") 930.

The dynamic Fresnel module 902 reflects and focuses light 928 from a light source 926. More specifically, the dynamic Fresnel module 902 may include an array controller 906 and a logic module 908 that perform one or more operations to determine the CGH 930 that is to be rendered by the modulation array 904 at any given point in time. The CGH 930 in the modulation array 904 may represent a pattern that modulates incident light into a multi-depth image. For example, the CGH 930 may reflect image light 924 to form an image include a robot statute 106 that appears to be at a distance of 100 meters and a cartoon-like avatar character 108 that appears to be at a distance of 1 meter. In some embodiments, the modulation array 904 may be a phase-only reflective LCOS module. As described below in reference to FIGS. 14-16, the quality of multi-depth images that are generated by system 900 may depend on the level of quantization of such an LCOS (i.e., the total number of different states that each reflector in the LCOS is capable of being placed in). For instance, 8-bit LCOS modulation array, such as the GAEA 4K Ultra HD 10 MP phase-only LCOS, may be capable of producing multi-depth images that are higher in perceptual quality than those of a 1-bit LCOS modulation array.

The source light 928 may be a stream of light of color and intensity that remain fixed over the course of the display of multiple frames or images. In some embodiments, the source light 928 may be a stream of light including some or all of the color components represented in multi-depth images to be displayed. For instance, the source light 928 may be a static stream of white light. At any given point in time, the geometry of the CGH 930 may correspond to a particular frame of a multi-depth image. More specifically, the geometry and design of the CGH 930 may correspond to a particular frame of a multi-depth image may correspond to the colors and intensities of the frame to be displayed, as well as the locations in three-dimensional space at which each portion of the frame is to be displayed. As such, the CGH 930 may be adjusted on a frame-by-frame basis over the course of the presentation of the multi-depth image sequence. As such, characteristics (color, intensity, 3-D location, etc.) of portions of the source light 928 having reflected off of the modulation array 400 will be changed by changes in the CGH 930 on the modulation array 904 over time. The CGH 930 may include specific geometries that leverage principles similar to those Fresnel lens patterns to create destructive interference between light of undesired wavelengths at particular locations in three-dimensional space. The CGH for a particular target 3-D image can be generated using various algorithms (e.g., the Gerchberg-Saxton algorithm). The static light source 926 in system 900 is smaller and less power intensive than the dynamic (e.g., RGB) light source 826 in system 800. Although, in some embodiments, light source 826 in system 800 may substantially similar to that of the static light source 926 in system 900. In these embodiments, the Fresnel patterns that are displayed by the modulation array 804 may be determined based on the desired focal point of the voxel, as well as the desired color of the voxel.

Fresnel lenses/projectors can form CGH to project a 3-D image with parts at multiple depth planes. With any 3-D projector, there is a path between the light source and the final image including composites of distances and images. Some or all of the voxels that make up a 3-D image may be generated simultaneously using a CGH. One explanation for this result is that subparts of the Fresnel lens are focused to different depth planes. One example would be four subparts, but there can be many more subparts. Compound Fresnel pattern where different portions of the modulation array focus corresponding different portions of the image to different depths.

An alternative explanation is that for the different depths, every portion of the modulation array (e.g., LCOS) is used for different portions of the amplitude. Mathematically, the CGH it is a composite. The CGH on the plane of the modulation array may be representative of the Fourier transform of the target 3-D image to the light source. The CGH that is ultimately rendered on the plane of the modulation array may, in some embodiments, be a composite pattern generated based on the Fourier transform of the target 3-D image and the Fresnel patterning that corresponds to the specific location in three-dimensional space at which each portion of the target 3-D image is to be presented. Spatial information is converted into amplitude at the modulation array plane so that the light source can be modulated. As a result, the Fresnel modulation array is capable of delivering a 3-D image toward a user's eye.

The respective systems 800, 900 depicted in FIGS. 8 and 9 have different advantages. In FIG. 8, the locations of all voxels that can be created by the system 800 may be known in advance. The system can generate all the Fresnel patterns 830 needed to generate (i.e., represent) voxels in all possible locations and store the Fresnel patterns in the system memory (e.g., in a field programmable gate array and/or RAM). Whenever a voxel is needed at a particular location, the system 800 can call up the Fresnel pattern 830 representing that location from the system memory. When light 828 from the light source 826 reflects off of the modulation array 804, the voxel shows up in the target location.

In FIG. 9, an entire 3-D image is generated by the system 900 instead of a series of voxels. The system 900 generates the 3-D image with a CGH 930 on the surface of the modulation array 904. If the system 900 knows the images that will be generated (e.g., for a 3-D movie), the system 900 can pre-generate all of the CGHs and store them in advance of sequential display. If the system 900 does not know the images that will be generated, it cannot store pre-generated CGHs 930. 3-D images generated using the CGH 930 in FIG. 9 may have improved resolution when compared to the rastered 3-D image generated using the Fresnel pattern 830 in FIG. 8.

An exemplary 3-D image has a 9 MP image at each depth. In the system 800 depicted in FIG. 8, the Fresnel patterns for the locations of all those voxels can be stored for instance on the system RAM. To generate a 3-D image, the system 800 cycles through all those voxels as fast as possible given the speed limitations of the processor (e.g., an FPGA) and the modulation array 804. For example, a 9 MP image rastering at 500-600 MHz may generate a 3-D image of relatively high perceptual quality. Therefore, rastering systems, like the one depicted in FIG. 8, are limited by the speed of processor and the modulation array 804. For single pixel rastering systems, such as the one depicted in FIG. 8, the rate limiting step/component may be the switch rate of the modulation array 804.

In some embodiments, the modulation array 904 in FIG. 9 may operate a lower speeds (e.g., LCOS at KHz switch rates) than the modulation array 804 in FIG. 8 does, as the rate at which frames are displayed in a frame-by-frame system may be much lower than the rate at which voxels are scanned in a voxel-by-voxel system and still translate to multi-depth images being presented at equal or higher rates. The system 900 pre-generates a series of CGHs corresponding to a sequence of 3-D frames. The system 900 can cycle through the series of CGHs/3-D frames to display 3-D motion graphics. A frame-by-frame system with pre-generated CGHs is limited by the frame rate of the high density LCOS. A frame-by-frame system that generates CGHs on the fly (i.e., in real time) is limited by the computationally intensive step CGH generation step and processor speed. The processor speed may be balanced against other metrics such as size, weight, heat, and the like.

FIGS. 8 and 9 represent two ways of generating a 3-D image: one voxel at a time with rastering (FIG. 8); or one image at a time (FIG. 9). Corresponding system speed requirements include fast rastering (FIG. 8) and quickly generating CGHs representing each 3-D image (FIG. 9).

Figure 10:
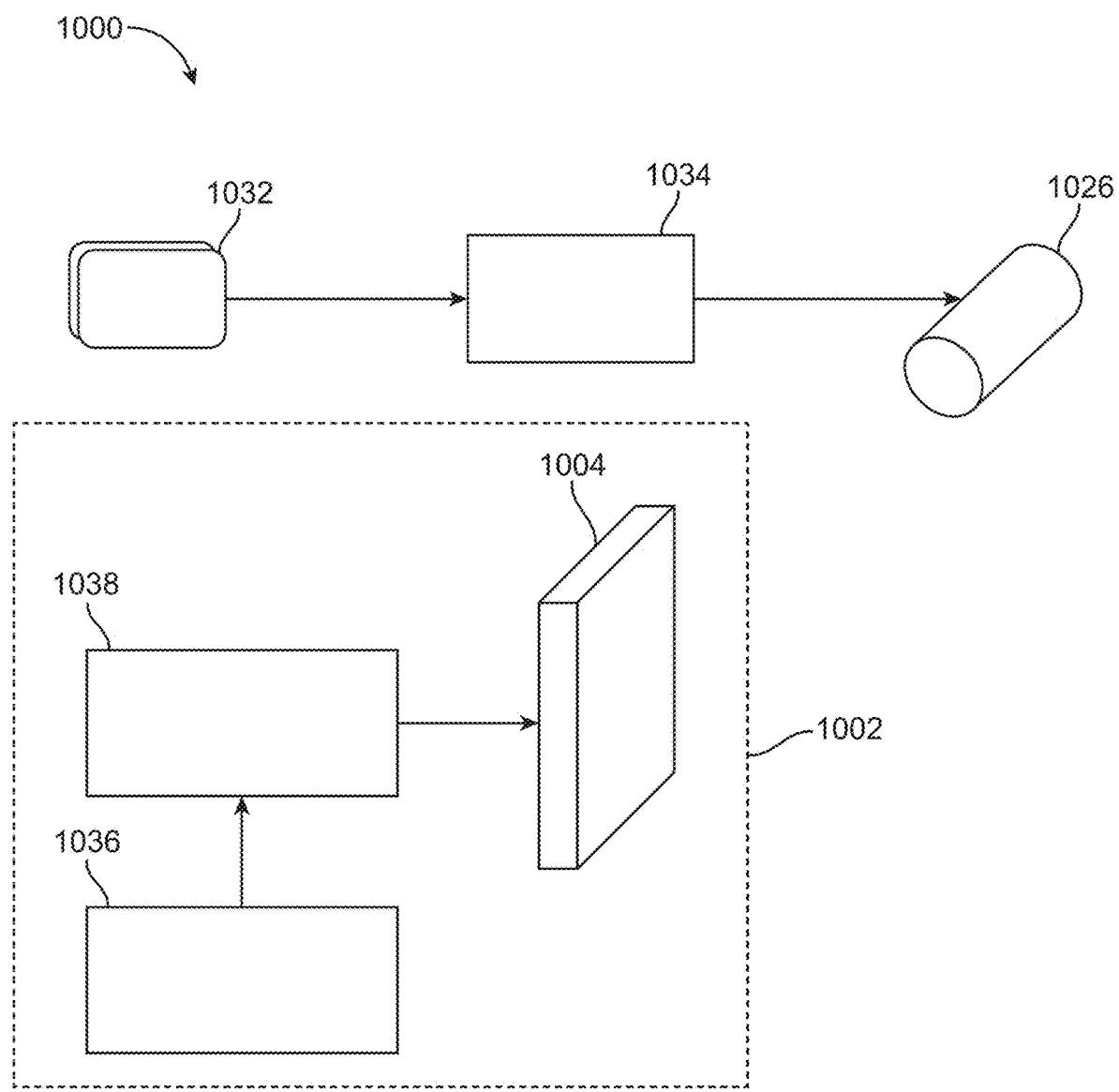
Figure 11:
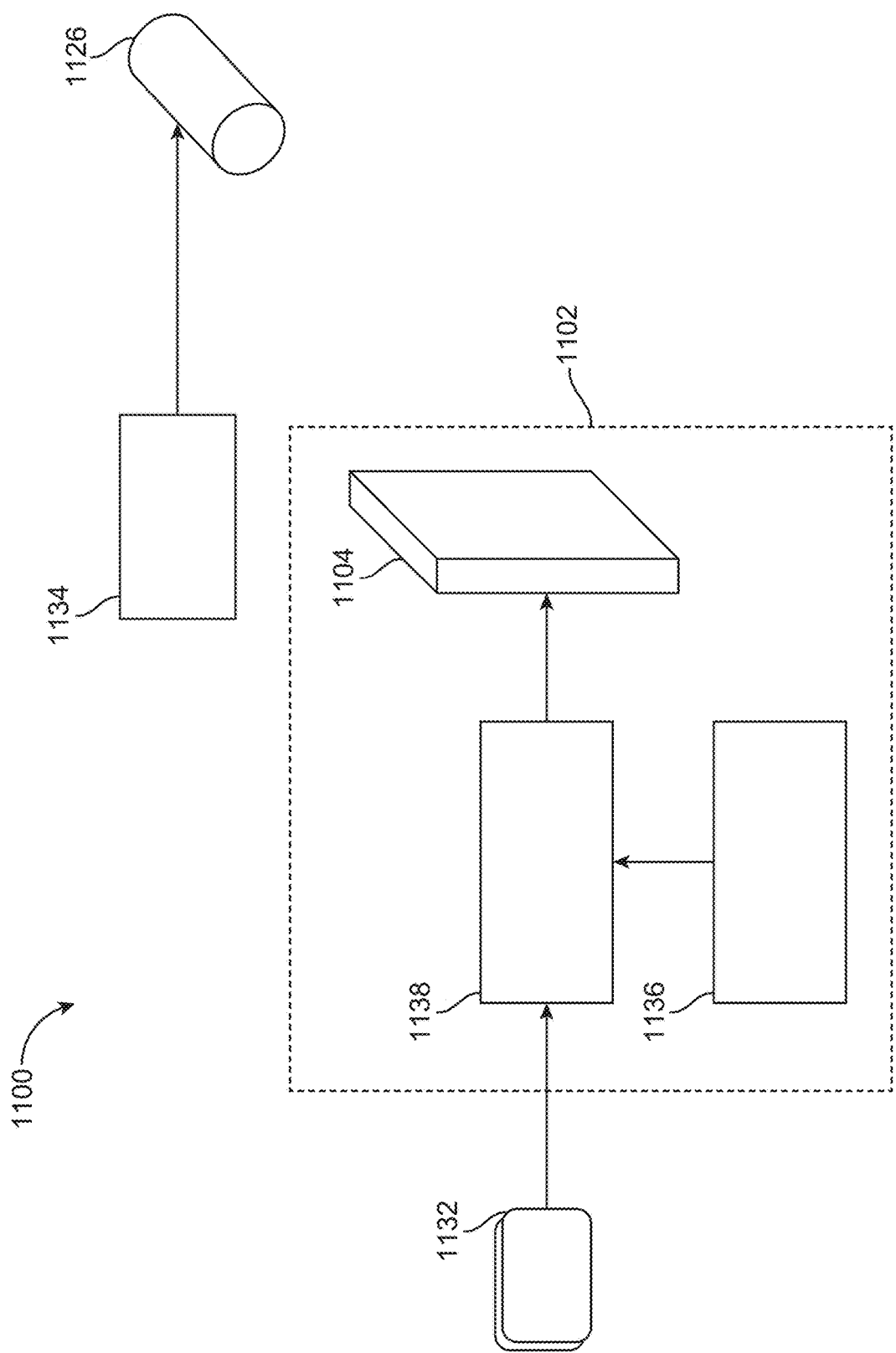

FIGS. 10 and 11 schematically illustrate components of systems 1000, 1100 for generating multi-depth image sequences comprising a dynamic Fresnel module 1002, 1102, as according to some embodiments. The system 1000 depicted in FIG. 10, is similar to the system 800 depicted in FIG. 8 in that both systems generate a 3-D image one voxel at a time with rastering. The input signal 1032 including image information is input to the light source controller 1034, which instructs the dynamic light source 1026 to vary the characteristics of the source light according to generate a voxel of a 3-D image corresponding to the image information. The focal point location determination unit 1036 determines the location of the voxel in the 3-D image. The focal point location determination unit 1036 sends the determined location information to the modulation pattern determination unit 1038, which generates or calls up a pre-generated a Fresnel pattern for display on the modulation array 1004 that focuses the image light to the 3-D location corresponding to the location information. As such, the system 1000 projects one voxel of the 3-D image. Rastering through all of the voxels generates the 3-D image. For embodiments in which the modulation array 1004 reflects light from the light source 1026 into diffraction gratings (e.g., ICG) of one or more DOE layers configured to deflect and ultimately output image light at angles that mimic real-world diffractive effects, the location of the focal point to which the Fresnel pattern displayed on the modulation array 1004 corresponds may be the same for one or more voxels that are to be displayed at the same depth. That is, because the angle at which light is provided to such diffractive gratings may dictate the position within three-dimensional space at which such light appears to the viewer, the modulation array 1004 may, in these embodiments, may raster voxels located within the same depth plane by displaying Fresnel patterns that direct light to same focal point on the DOE, but from different locations on the surface of the modulation array 1004. In this way, the modulation array 1004 may operate to effectively modulate the angle at which light is provided as input to the DOE for a given depth. The system 1100 depicted in FIG. 11, is similar to the system 900 depicted in FIG. 9 in that both systems may generate a complete 3-D image using a CGH on a modulation array 1104. The light source controller 1134 instructs the static light source 1126 to either project or not project the source light to generate the 3-D image. The input signal 1132 including image information is input to the focal point location determination unit 1136, which determines the locations of the voxels of the 3-D image. The focal point location determination unit 1136 forwards the input signal 1132 along with the determined location information to the modulation pattern determination unit 1138, which generates or calls up a pre-generated Fresnel pattern/CGH that focuses portions of the image light to various 3-D locations to form the 3-D image. As such, the system 1100 generates and projects the 3-D image as a single frame.

Using a CGH 930 such as that shown in the system 900 depicted in FIG. 9 can potentially minimize system components to a light source and a modulation array. Such systems can be implemented without lenses, reducing volume and weight of these systems. These systems can be implemented without any waveguides (see FIG. 11). Even without waveguides, the Fresnel modulation array and the light source can focus light into a user's eyes without other optical components (e.g., relay lens, variable focus elements, etc.). These systems may include a meniscus lens that directs the output from the Fresnel modulation array into the user's eye. As such, these systems can be small enough to be incorporated in a conventional eyeglasses form factor.

Figure 12:
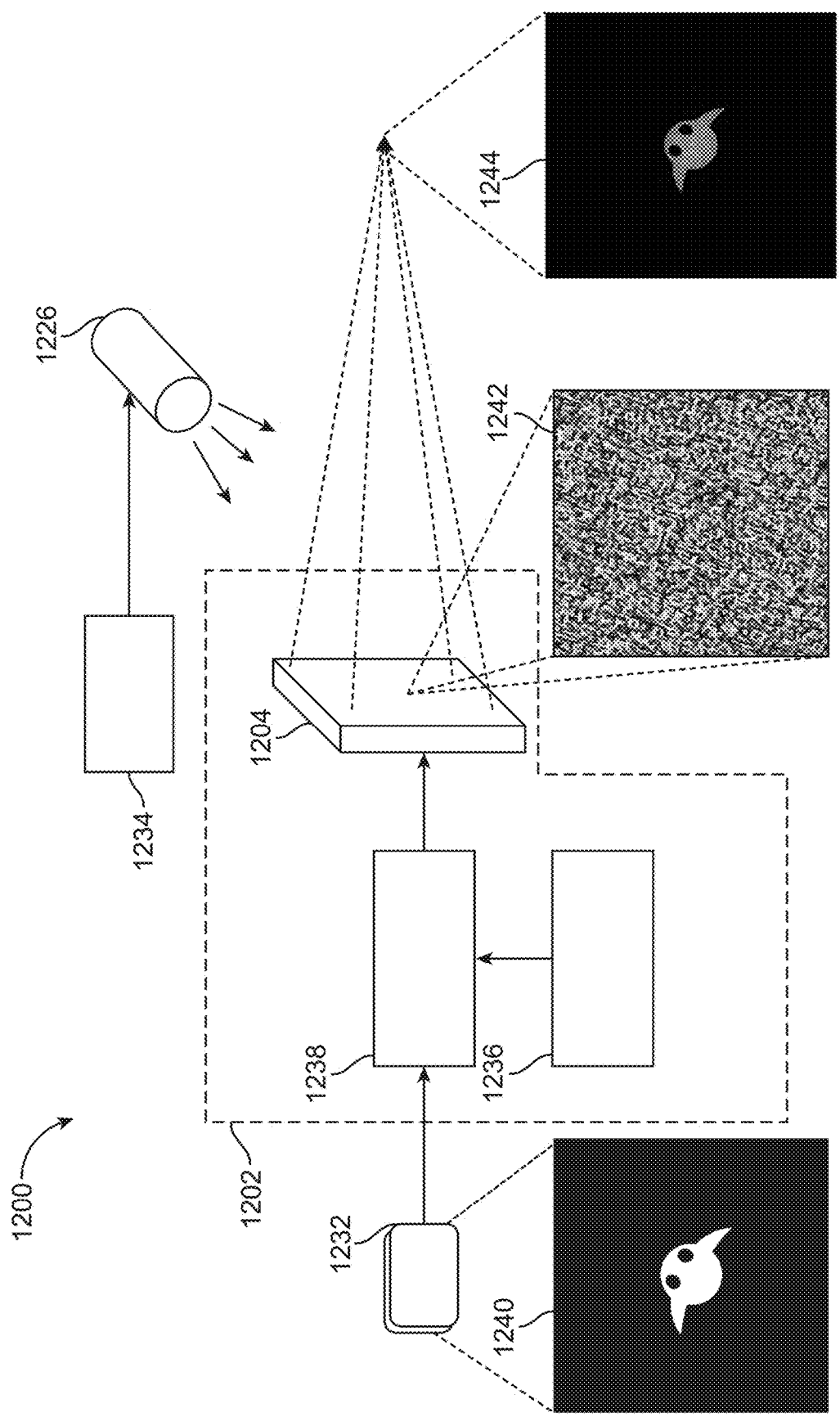
FIG. 12 illustrates a system for generating multi-depth image sequences comprising a dynamic Fresnel module and a DOE assembly, and various patterns associated therewith, as according to some embodiments.

FIG. 12 depicts a system 1200 almost identical to the system 1100 depicted in FIG. 11. That is, elements 1204-1238 may provide similar utility in system 1200 as elements 1104-1138 may provide in system 1100, respectively. The system 1200 is a frame-by-frame system (e.g., FIGS. 9 and 11) instead of a voxel-by-voxel system (e.g., FIGS. 8 and 10). FIG. 12 also depicts three patterns associated with various portions of the system 1200. A target image 1240 (see also FIG. 13) is associated with the input signal 1232. The target image 1240 represents the image that the system 1200 is attempting to project. While the target image 1240 is a 2-D image in this example, it may be a 3-D image similar to those described above. A CGH image 1242 is associated with the modulation array 1204. The CGH image 1242 simulates the appearance of a portion of the surface of the modulation array 1204 that is configured to generate/project the target image 1240. A projected image 1244 is associated with image light 1224 reflecting off of the modulation array 1204. The projected image 1244 simulates the appearance of the image projected by the system 1200 (using the CGH image 1242) based on the target image 1240.

Figure 13:
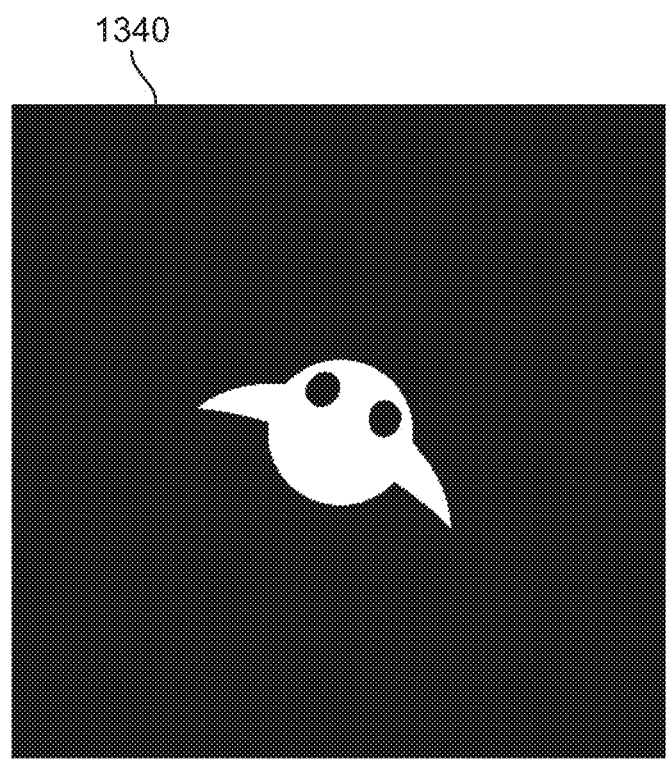
FIG. 13 illustrates a target image, as according to some embodiments.
Figures 14A, 14B:
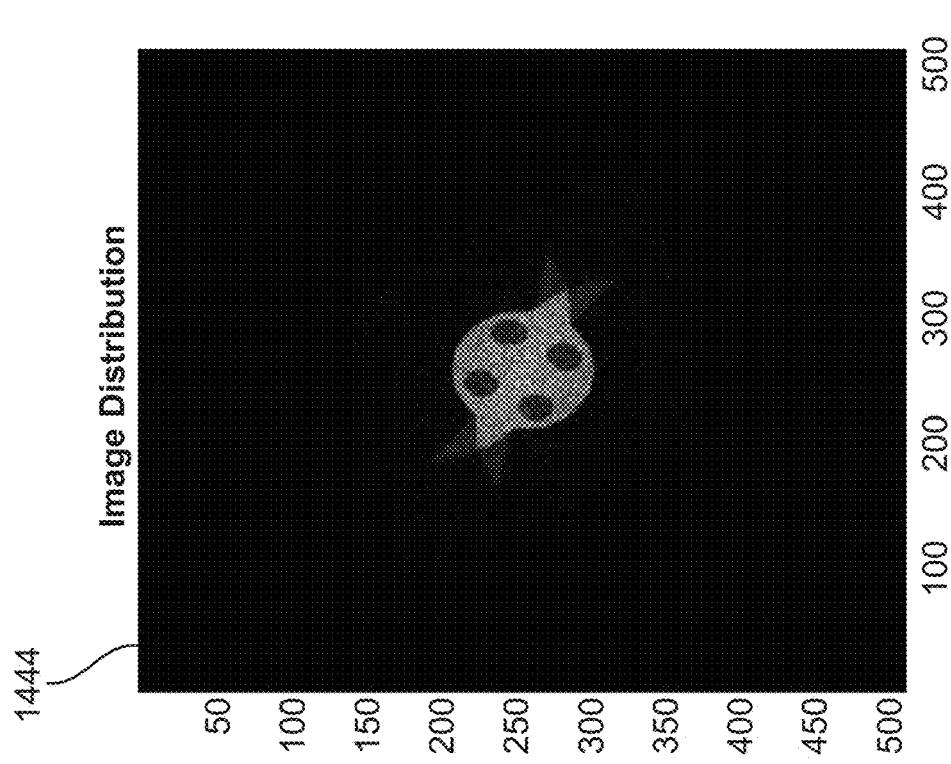
FIGS. 14A, 15A, and 16A illustrate generated images, as according to some embodiments.
FIGS. 14B, 15B, and 16B illustrate computer generated holograms, as according to some embodiments.

FIGS. 14A-16B illustrate various CGH images 1442, 1542, 1642 and projected images 1444, 1544, 1644 based on the target image 1340 depicted in FIG. 13. FIGS. 14A and 14B simulate patterns associated with a system using a 1-bit LCOS. FIG. 14A depicts a simulated projected image 1444. FIG. 14B depicts a simulated CGH image 1442 at a modulation array. With a 1-bit LCOS, every reflector on the LCOS is in one of two states (i.e., binary or two level quantization). This limited 1-bit LCOS results in a projected image 1444 that is distorted (e.g., mirrored and flipped). As such, a 1-bit LCOS may be leveraged to provide computational savings in AR systems that are robust to distortion, such as a voxel-by-voxel system.

Figures 15A, 15B:
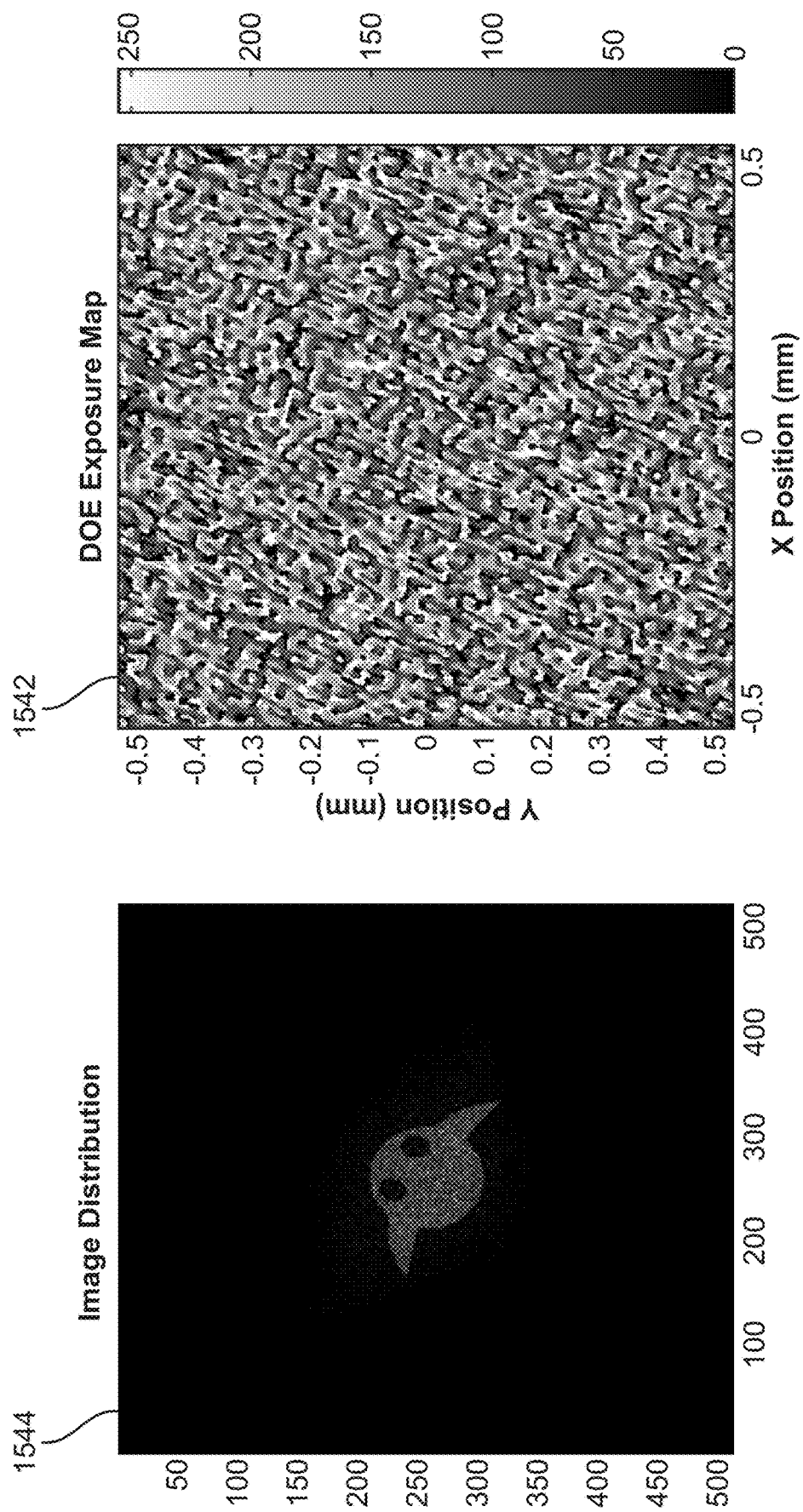

FIGS. 15A and 15B simulate patterns associated with a system using a 2-bit LCOS. With a 2-bit LCOS, every reflector on the LCOS is in one of four states (i.e., four level quantization). As shown in the FIG. 15A, the simulated projected image 1544 is not mirrored or flipped, and thus represents an improvement over the simulated projected image 1444. FIG. 15B depicts a simulated CGH image 1542 at a modulation array.

Figures 16A, 16B:
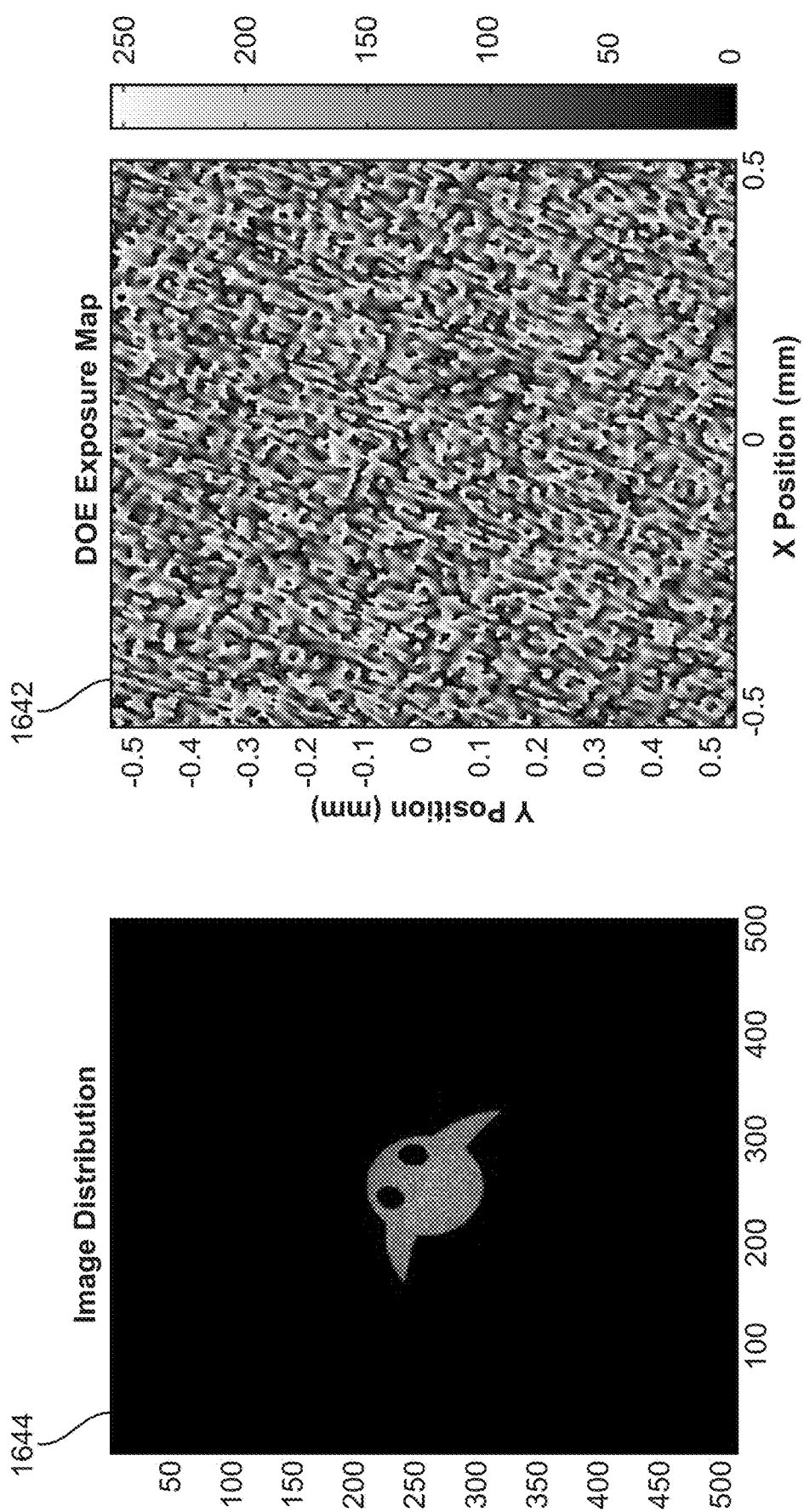

FIGS. 16A and 16B simulate patterns associated with a system using an 8-bit LCOS. With an 8-bit LCOS, every reflector on the LCOS is in one of 256 states (i.e., 256 level quantization). As shown in the FIG. 16A, the simulated projected image 1644 is representation of the target image 1340 that is even higher in quality than the simulated projected image 1544. The frame-by-frame system 900 depicted in FIG. 9 includes an 8-bit LCOS 904. FIG. 16B depicts a simulated CGH image 1642 at a modulation array.

The CGH 1642 of the 8-bit LCOS is more complicated than the CGHs 1542, 1442 of the 2-bit or 1-bit LCOSs. While this higher bit level LCOS results in higher quality representations of target images, a higher bit level of LCOS requires more processor cycles/computation to generate a more complicated CGH. As such, an 8-bit LCOS may be leveraged to provide relatively high quality target images in AR systems with processing resources sufficient to handle the corresponding computational load. Other LCOSs may include 16-bit, 32-bit, and 64-bit depending on the speed of the processors and/or the architecture and capabilities of LCOS drive circuitry.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A system for generating multi-depth image sequences, comprising:
   one or more light sources;
   one or more modulation array comprising a plurality of light modulators, the one or more light sources configured to project light on the plurality of light modulators; and
   a processor configured to synchronously direct the one or more light sources and the plurality of light modulators to generate sequences of multi-depth images by rastering a plurality of voxels at different image depth planes, wherein to generate each voxel of each multi-depth image, the processor is configured to
   determine a three-dimensional location of the voxel within of an image depth plane of a multi-depth image based at least partially on a head rotation of a user and an eye rotation in the opposite direction of the head rotation, and
   direct the one or more light sources to project light onto the plurality of light modulators to form a Fresnel pattern so that the plurality of light modulators focuses light corresponding to the identified Fresnel pattern onto the voxel at the determined three-dimensional location to form a portion of the multi-depth image.

2. The system of claim 1, wherein the plurality of light modulators are configured to shift a phase of the light by a number of degrees.

3. The system of claim 1, wherein the plurality of light modulators are configured to shift a phase of the light according to a modulation shift pattern.

4. The system of claim 1, wherein the one or more light sources comprises a green light source, a red light source, and a blue light source.

5. The system of claim 4, wherein the one or more modulation arrays comprises a first modulation array configured to receive red light, a second modulation arrays configured to receive green light, and a third modulation arrays configured to receive blue light.

6. The system of claim 4, wherein the one or more modulation arrays comprises a partitioned modulation array, the partitioned modulation array comprising a first area configured to receive red light, a second area configured to receive green light, and a third area configured to receive blue light.

7. The system of claim 1, further comprising a diffractive optical assembly comprising one or more waveguide layers, wherein respective waveguide layers correspond to respective image depth planes comprising respective rastered voxels.

8. The system of claim 1, wherein the one or more light sources, the one or more modulation arrays, and the processor are components of an augmented reality system wearable by a user of the system,
   wherein the processor is housed in a belt pack of the wearable augmented reality system, and
   wherein the belt pack is operably coupled to wearable optics comprising the one or more light sources and the one or more modulation arrays.

9. The system of claim 1, wherein the processor is configured to direct the plurality of light modulators to sequentially form respective Fresnel patterns for respective voxels.

10. The system of claim 9, wherein at least two of the plurality of Fresnel patterns are configured to sequentially focus the light on respective different voxels at different image depth planes.

11. The system of claim 1, wherein the processor is configured to execute a raster scan on a voxel-by-voxel basis so that at any point in time during the raster scan, light from the one or more light sources is focused on a particular voxel of the multi-depth image.

12. The system of claim 11, wherein the processor is configured to execute the raster scan on the voxel-by-voxel basis in a particular image depth plane of the multi-depth image.

13. The system of claim 1, wherein the processor is configured to adjust a color and an intensity of light emitted by the one or more light sources on a voxel-by-voxel basis.

14. The system of claim 1, wherein the processor is configured to perform a raster scan and modify one or more voxels of a first image depth plane of the multi-depth image while voxels in a different, second image depth plane of the multi-depth image are constant.

15. The system of claim 1, wherein the processor is configured to perform a raster scan and modify one or more voxels of a first image depth plane of a multi-depth image while voxels in multiple other image depth planes of the multi-depth image are constant.

16. The system of claim 1, where the processor is configured to raster voxels individually so that an entire multi-depth image is not projected by the one or more modulation arrays.

17. The system of claim 1, wherein the processor is configured to perform a raster scan by directing the plurality of light modulators to sequentially form a plurality of Fresnel patterns that are sequentially focused on respective different voxels during a raster scan.

18. The system of claim 17, wherein the processor is configured to direct the plurality of light modulators to change a Fresnel pattern of light reflected off of the one or more modulation arrays to move a location of a target voxel during the raster scan.

19. The system of claim 18, wherein the one or more modulation arrays is configured to refresh the Fresnel pattern to function as a voxel rastering projector that generates a three-dimensional image voxel-by-voxel.

20. The system of claim 1, the one or more modulation arrays comprising a dynamic Fresnel module configured to change respective modulated shift patterns, wherein respective modulated shift patterns are sequentially focused on respective voxels.

* * * * *